United States Patent Office 3,132,137
Patented May 5, 1964

3,132,137
STEROIDO[3.2-d]PYRIMIDINES AND
PREPARATION THEREOF
Raymond O. Clinton, East Greenbush, N.Y., assignor to Sterling Drug Inc., New York, N.Y., a corporation of Delaware
No Drawing. Filed Nov. 18, 1960, Ser. No. 70,108
14 Claims. (Cl. 260—239.5)

This invention relates to heterocyclic substituted steroids, and in particular it is concerned with steroido [3.2-d]pyrimidines and the preparation thereof.

It has been found that new and useful compounds are produced when a pyrimidine ring is fused through its 4- and 5-positions to the 3- and 2-positions, respectively, of a steroid nucleus, said steroid having from seventeen to about twenty-three carbon atoms exclusive of ester radicals.

The ring structure of the compounds of the invention is represented by the following structure:

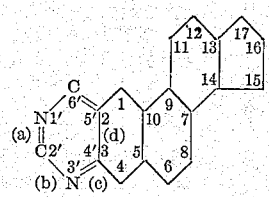

The exact nature of the steroid moiety is not critical, and it can be derived from any steroid of the general type known to exhibit hormonal or other pharmacological or endocrinological properties. Such steroid moieties have from seventeen to about twenty-three carbon atoms, not counting carbon content which may be provided by esterified hydroxy groups. Esterified hydroxysteroids are included within the scope of the invention, but the carbon content contributed by the acid moiety of the ester is not considered part of the essential carbon content of the steroid.

The steroid moiety can be any member of the estrane, 18-norestrane, androstane, etiocholane, pregnane or allopregnane series. The foregoing can contain varying degrees of unsaturation and a variety of substituents in the form of hydrocarbon radicals or functional groups conventionally employed in the steroid art. Representative of the steroid moieties which make up the compounds of the invention are those having at position 17 a hydroxy, acyloxy, oxo, or both a hydroxy and a lower-alkyl radical, characteristic of the androgenic and anabolic steroids; or a lower-alkenyl, lower-alkynyl, acetyl, hydroxyacetyl, 1,2-dihydroxyethyl, 1-hydroxyethyl, and the like radicals, characteristic of the progestational and adrenal cortical steroids. The steroid moiety can also have one or more substituents at other positions of the nucleus, for example, hydroxy, acyloxy, or oxo radicals at positions 1-, 4-, 5-, 6-, 7-, 8-, 9-, 11-, 12-, 14-, 15- or 16- (the oxo groups being restricted to positions having secondary carbons); halogen atoms, preferably fluorine, chlorine or bromine, for example, at the 1-, 4-, 5-, 6-, 7-, 8-, 9-, 11-, 12-, 14-, 15-, 16-, 17- or 21-positions; and one or more lower-alkyl groups, for example, at the 1-, 4-, 5-, 6-, 7-, 8-, 9-, 11-, 12-, 14-, 15- or 16-positions. The steroid moiety can also have one or more double bonds, especially at the 4,5- and/or 1,2- and/or 6,7-positions. The steroid moiety usually possesses angular methyl groups at $C_{10}$ and $C_{13}$, although 18- and 19-norsteroids and 18,19-bisnorsteroids, lacking one or both of the angular methyl groups at $C_{13}$ and $C_{10}$, respectively, are also representative steroids.

The 18,19-bisnorsteroid, 18- and 19-norsteroid and normal steroid moieties in the compounds of the invention contain, respectively, seventeen, eighteen and nineteen carbon atoms plus any carbon content which may be provided by one or more nuclearly substituted carbon containing radicals, up to and including a total of about twenty-three carbon atoms, exclusive of ester radicals.

When acyloxy radicals are present in the steroid moiety, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl ($\beta$-carboxypropionyl); cycloalkyl-lower-alkanoyl radicals, e.g., $\beta$-cyclopentylpropionyl, $\beta$-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, $\beta$-phenylpropionyl, cinnamoyl, and the like; and monocarbocyclic aryloxy-loweralkanoyl radicals, such as p-chlorophenoxyacetyl, and the like. Esters of inorganic acids, for instance, phosphoric acid, are also contemplated.

The compounds of the invention are prepared by reacting a 2-(1-hydroxy-lower-alkylidene)-3-oxo-steroid with a lower-alkanoamidine or an acid-addition salt thereof in the presence of a basic tertiary amine or an alkali metal alkoxide according to the following equation:

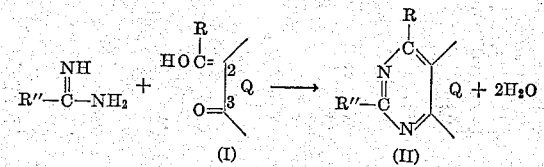

In the above general Formulas I and II, Q represents the remaining portion of the steroid moiety described above.

In the above Formulas I and II, R and R'' each represents a hydrogen atom or a lower-alkyl radical having preferably from one to about four carbon atoms, thus including such groups as methyl, ethyl, propyl, isopropyl, butyl, and the like.

The condensation of the lower-alkanoamidine with a 2-hydroxy-lower-alkylidene-3-oxo-steroid can be carried out by heating said steroid with at least one molar equivalent of lower-alkanoamidine or acid-addition salt thereof in the presence of a basic tertiary amine or alkali metal alkoxide in an inert solvent at a temperature between about 50° C. and 150° C.

If the steroid moiety has a double bond already present in the 1,2-position, the essential steroid intermediate is a 2-formyl-$\Delta^1$-steroid (III; R is H) or a 2-lower-alkanoyl-$\Delta^1$-steroid (III; R is lower-alkyl). The reaction is represented by the following equation:

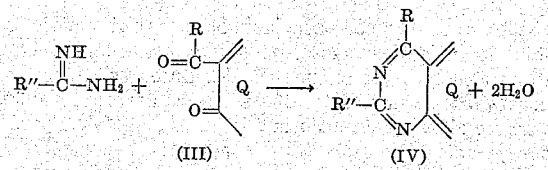

The intermediate 2-acyl-$\Delta^1$-steroid (III) can be prepared by bromination or chlorination of a 2-acyl steroid (I) in the 2-position, followed by dehydrohalogenation with collidine or with lithium chloride in dimethylformamide solution.

Compounds having an aromatic ring A characteristic of the estrogens (estratriene compounds), viz.:

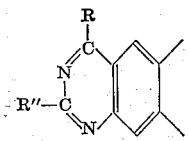

can be prepared by dehydrogenation of the corresponding Δ⁴-19-norsteroido-pyrimidine by procedures well-known in other cases to aromatize ring A, as by heating with palladium-on-carbon catalyst.

A particularly preferred group of compounds, derived from readily available starting materials, comprises those having the structural formula

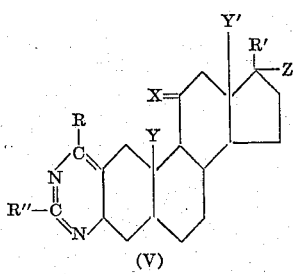

(V)

wherein R and R″ each represents hydrogen or a lower-alkyl radical; R′ represents hydrogen or a lower-alkyl, lower-alkenyl, lower-alkynyl, the acetyl, the hydroxy-acetyl, the 1,2-dihydroxyethyl or the 1-hydroxyethyl radical; X is selected from the group consisting of $H_2$, (H)(OH) and O; Y and Y′ represent hydrogen or the methyl radical; and Z represents hydrogen or the hydroxy radical, Z being restricted to hydroxy when R′ represents hydrogen, or a lower-alkyl, lower-alkenyl or lower-alkynyl radical. Antoher preferred aspect of the invention includes compounds differing from V in having a further double bond in the 4,5-position (VI), or in both the 4,5-position and the 6,7-position (VII):

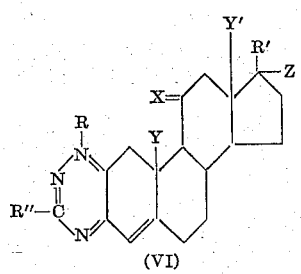

(VI)

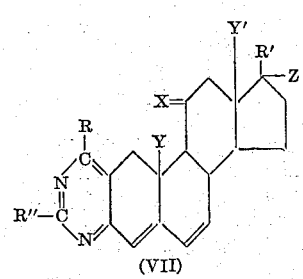

(VII)

The preferred aspects also include carboxylic acid esters of compounds of structures V, VI and VII when carbinols. Still another aspect includes acid-addition salts and quaternary ammonium salts of the foregoing compounds.

In the above general Formulas V, VI and VII, R′, when it represents a lower-alkyl, lower-alkenyl, or lower-alkynyl radical, has from one to about four carbon atoms and may be straight or branched, and thus includes such groups as methyl, ethyl, propyl, isopropyl, butyl, isobutyl, tertiary-butyl, vinyl, 1-propenyl, 2-propenyl, ethynyl, propargyl, and the like.

The compounds of Formulas V, VI and VII are prepared by reacting the appropriate 2-(1-hydroxy-lower-alkylidene)-3-oxosteroid, viz.:

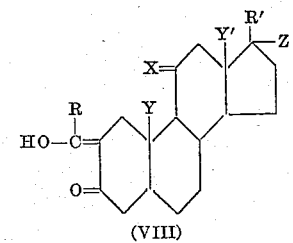

(VIII)

or the corresponding compounds where double bonds are present in the 4,5- or the 4,5- and 6,7-positions, with a lower-alkano-amidine or an acid-addition salt thereof; R, R′, X, Z, Y and Y′ have the same meanings given above. When the steroid moiety contains oxo groups in addition to the one at position 3, these can be protected as ketal derivatives to prevent competing reactions. For example, when compounds in which R′ represents acetyl or hydroxyacetyl are desired, these radicals can be ketalized by known methods, e.g., with ethylene glycol, prior to introduction of the hydroxy-lower-alkylidene radical at the 2-position and reaction with a lower-alkanoamidine. It has been found, however, that 3,20-dioxo-steroids bearing hydroxy groups at the 17- and 21-positions can be selectively formylated in the 2-position without need for protecting the 20-oxo group by ketalization.

The 20-monoketals of 3,20-dioxo-steroids are prepared from the 3,20-diketals by selective hydrolysis by known methods, e.g., by allowing the diketal to stand at room temperature in acetone solution containing a trace of p-toluenesulfonic acid. The ketal groups are readily cleaved by dilute acid after the condensation with the lower-alkanoamidine. An oxo group at the 11-position is relatively unreactive and need not be protected.

The present invention has provided a new class of steroid compounds, namely steroido[3.2-d]pyrimidines, and these compounds have now been made available for study as to their endocrinological activities. Compounds of the invention have indeed been found to possess such activities as set forth below, and they are also useful as intermediates in the preparation of different species within the scope of the invention by introduction of new groups or alteration of groups already present in the steroid nucleus by known methods. For example, a steroido[3.2-d]pyrimidine having a hydroxy group in the 17-position of the steroid nucleus (V, VI or VII; R′ is H, Z is OH) can be oxidized to the corresponding 17-oxo compound. As another instance, a steroido[3.2-d]pyrimidine having a 1-hydroxyethyl radical in the 17-position (V, VI or VII; R′ is $CH_2CH(OH)$—, Z is H) can be oxidized to the corresponding 17-acetyl compound (V, VI or VII; R′ is $CH_3CO$—, Z is H).

The intermediate 2 - hydroxy-lower-alkylidene - 3 - oxosteroids (I) are prepared by condensing a 3-oxo-steroid, a 3-oxo-Δ⁴-steroid or a 3-oxo-Δ⁴,⁶-steroid with a lower-alkyl lower-alkanoate, RCOOR‴, wherein R is hydrogen or lower-alkyl and R‴ is lower-alkyl, in the presence of a strong base under anhydrous conditions. The strong base is preferably an alkali metal lower-alkoxide, amide or hydride. An acyl group enters the 2-position with elimination of a molecule of an alcohol as follows:

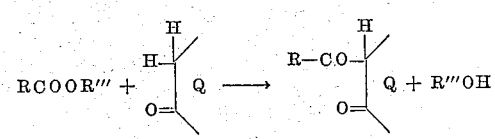

In the case wherein the radical R is lower-alkyl an alternative and preferred method comprises treating the 3-oxosteroid with a lower-alkanoic acid anhydride in the presence of boron trifluoride. Steroids containing a 17-hydroxy group, particularly the 17-hydroxy-17-alkyl steroids, can be protected against dehydration by prior esterification.

Although, by analogy with halogenation procedures, it would be expected that ring A saturated compounds of the etiocholane series (ring juncture A/B cis) would form 4-hydroxy-lower-alkylidene derivatives rather than 2-hydroxy-lower-alkylidene derivatives, it has been found that the latter are produced preponderantly. This was proved by preparing a $\Delta^4$-steroido[3.2-c]pyrazole from a 2-hydroxy-methylene-$\Delta^4$-steroid, according to the method described in the copending application of R. O. Clinton, Serial No. 723,148, filed March 24, 1958, hydrogenating the double bond to produce a mixture of saturated steroido[3.2-c]pyrazoles of the androstane and etiocholane series, and showing that the etiocholane isomer was identical with that produced by direct formation of the pyrazole from the hydroxymethylene derivative of the parent etiocholane compound. If the hydroxymethylene group had entered the 4-position, the resulting pyrazole would have been fused to the 3,4-position of the steroid nucleus and would have been different from the etiocholanopyrazole obtained by hydrogenation of the $\Delta^4$-compound. Therefore, etiocholane as well as androstane compounds are useful as starting materials in the preparation of the compounds of the invention.

Endocrinological studies of the compounds of the invention have shown that they possess useful metabolic, hormonal and anti-hormonal properties. In particular, they have favorable balances of anabolic, androgenic, pituitary inhibiting, estrogenic, progestational and adrenal cortical activities. Thus, compounds of the invention possess advantages in being anabolic (myotrophic and nitrogen retentive) at dose levels at which they do not show an appreciable degree of sex hormonal properties. Anabolic agents are useful in the alleviation of conditions arising from poor nitrogen utilization in various debilitating diseases by accelerating the growth of new healthy tissue. Generally speaking, the common anabolic agents possess a moderate to high degree of androgenic activity and their use in females leads to undesirable side-effects such as virilism and hirsutism. Therefore, the separation of these activities, as found in compounds of the present invention, which have high anabolic but low androgenic activities, is a highly desirable feature.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1

(a) 2 - Hydroxymethylene - 17$\alpha$ - methylandrostan - 17$\beta$-ol-3-one.—A solution of 20.7 g. of 17$\alpha$-methylandrostan-17$\beta$-ol-3-one in 500 ml. of benzene was added to sodium methoxide (prepared by dissolving 15.0 g. of sodium in 250 ml. of absolute methanol, concentrating the solution and drying the residue for one hour at 150–160° C. and 15 mm.). Ethyl formate (48.8 g.) was then added with stirring in a nitrogen atmosphere. The reaction mixture was stirred for four hours longer at room temperature, allowed to stand for about fifteen hours, stirred for two hours longer and then poured into water. The reaction mixture was extracted with benzene, the aqueous layer warmed until clear, filtered and cooled below room temperature. Concentrated hydrochloric acid and ice were added to the filtrate until the mixture was acid to Congo Red, and the product was extracted with chloroform. The chloroform extracts were washed with water, dried over anhydrous sodium sulfate, filtered and concentrated in vacuo to a volume of 80 ml., whereupon there separated 14.89 g. of 2-hydroxymethylene-17$\alpha$-methylandrostan-17$\beta$-ol-3-one, M.P. 179–183° C. (uncorr.). A sample when recrystallized from an ether-methanol mixture and dried at 80° C. in vacuo had the M.P. 185–190.5° C. (corr.), $[\alpha]_D^{25} = +35.9°$ (1% in chloroform); ultraviolet maximum at 282 m$\mu$ (E=10,300).

Analysis.—Calcd. for $C_{21}H_{32}O_3$: C, 75.86; H, 9.70. Found: C, 76.10; H, 9.53.

(b) 17$\beta$ - hydroxy - 17$\alpha$ - methylandrostano[3.2-d] 2'-methylpyrimidine [V; R is H, R' and R'' are $CH_3$, X is $H_2$, Z is OH, Y and Y' are $CH_3$ (rings A/B trans)].— A mixture of 6.65 g. of 2-hydroxymethylene-17$\alpha$-methylandrostan-17$\beta$-ol-3-one, 2.30 g. of acetamidine hydrochloride, 3.45 ml. of triethylamine and 16 ml. of anhydrous ethanol was refluxed for twenty-four hours. The mixture was then dissolved in ether and the ether extracted with concentrated hydrochloric acid diluted with four volumes of water. The acidic aqueous extracts were made strongly basic by adding an excess of 35% sodium hydroxide solution, the basic mixture was extracted with ether, and the ether solution dried over anhydrous sodium sulfate and concentrated to give 4.5 g. of a mixture of solid and orange oil. Ether was added and the solid removed by filtration. Benzene was added to the filtrate, the filtrate concentrated to remove the ether, and the solution chromatographed on a column of 250 g. of Florisil (activated magnesium silicate prepared according to U.S. Patent 2,393,625). The column was eluted with benzene and then with benzene containing gradually increasing amounts of ether. Eluants containing 15–20% ether in benzene brought out the desired product which was recrystallized twice from ethyl acetate and dried at 100° C. over phosphorus pentoxide for four hours to give 17$\beta$-hydroxy-17$\alpha$-methylandrostano[3.2-d]-2'-methylpyrimidine in the form of plate clusters, M.P. 161.2–163.4° C. (corr.); $[\alpha]_D^{25} = +31.7°$ (1% in chloroform); ultraviolet maximum at 260 m$\mu$ (E=4,500).

Analysis.—Calcd. for $C_{23}H_{34}N_2O$: C, 77.92; H, 9.67; N, 7.90. Found: C, 77.52; H, 9.86; N, 7.82.

When measured by its effect upon the growth of the levator ani muscle in the rat, 17$\beta$-hydroxy-17$\alpha$-methylandrostano[3.2-d]-2'-methylpyrimidine was found to possess myotrophic activity with a low degree of androgenicity. It was active when administered either subcutaneously or orally.

EXAMPLE 2

(a) 2 - hydroxymethyleneandrostan-17$\beta$-ol-3-one was prepared from androstan-17$\beta$-ol-3-one and ethyl formate in the presence of sodium methoxide in benzene solution according to the manipulative procedure described above in Example 1, part (a). The product was recrystallized from acetone and ether, giving 2-hydroxymethyleneandrostan-17$\beta$-ol-3-one, M.P. 126–132° C. (uncorr.); ultraviolet maximum at 282 m$\mu$ (E=8,400).

(b) 17$\beta$ - hydroxyandrostano[3.2-d]-2'-methylpyrimidine [V; R and R' are H, R'' is $CH_3$, X is $H_2$, Z is OH, Y and Y' are $CH_3$] was prepared from 6.40 g. of 2-hydroxymethyleneandrostan-17$\beta$-ol-3-one, 2.3 g. of acetamidine hydrochloride, 3.45 ml. of triethylamine and 16 ml. of anhydrous ethanol according to the manipulative procedure described above in Example 1, part (b). There was thus obtained 17$\beta$-hydroxyandrostano[3.2-d]-2'-methylpyrimidine in the form of colorless clusters of elongated prisms, M.P.163.4–165.2° C. (corr.) (recrystallized from ethyl acetate-hexane); $[\alpha]_D^{25} = +56.2°$ (1% in chloroform); ultraviolet maximum at 260 m$\mu$ (E=4,500).

Analysis.—Calcd. for $C_{22}H_{32}N_2O$: C, 77.60; H, 9.47; N, 8.23. Found: C, 77.76; H, 9.19; N, 7.87.

When measured by its effect upon the growth of the levator ani muscle in the rat, 17$\beta$-hydroxyandrostano[3.2-d]-2'-methylpyrimidine was found to possess myotrophic activity with a low degree of androgenicity when administered subcutaneously at a dose level of 11.2 mg./kg./day.

EXAMPLE 3

17β-hydroxy - 17α - methylandrostano[3.2-d]pyrimidine [V; R is H, R' is CH$_3$, R" is H, X is H$_2$, Z is OH, Y and Y' are CH$_3$] was prepared from 6.60 g. of 2-hydroxymethylene-17α-methylandrostan-17β-ol-3-one [Example 1(a)], 2.3 g. of formamidine hydrochloride, 3.4 ml. of triethylamine and 15 ml. of anhydrous ethanol according to the manipulative procedure described above in Example 1, part (b). There was thus obtained 17β-hydroxy-17α-methylandrostano[3.2-d]pyrimidine in the form of colorless prisms, M.P. 205.6–207.2° C. (corr.) (recrystallized from benzene); [α]$_D^{25}$=+29.7° (1% in chloroform); ultraviolet maximum at 254 mμ (E=4,100).

Analysis.—Calcd. for C$_{22}$H$_{32}$N$_2$O: C, 77.60; H, 9.47; N, 8.23. Found: C, 77.43; H, 9.31; N, 8.01.

EXAMPLE 4

(a) 2 - hydroxymethylene-17α-methyl-4-androsten-17β-ol-3-one.—To a dry 2 liter, 3-necked flask, fitted with a stopper, gas outlet stopcock and a condenser arranged for distillation into a receiver equipped with a calcium chloride tube, was added a solution of 50.0 g. (0.165 mole) of 17α-methyl-4-androsten-17β-ol-3-one in 1200 ml. of benzene. A portion of the benzene (200 ml.) was removed by distillation to insure anhydrous conditions. The distillation apparatus was replaced with an outlet tube connected to a gas trap which consisted of a U-tube filled with an amount of mercury that would allow the escape of any positive pressure built up in the reaction flask. A slow stream of nitrogen was introduced into the reaction flask through the gas outlet stopcock. Sodium hydride (10.0 g., 0.42 mole) and 35 ml. (0.43 mole) of ethyl formate, previously dried over phosphorus pentoxide and distilled, were added. The reaction mixture was allowed to stand at room temperature under a nitrogen atmosphere for five days, after which time an orange gel had formed and no further evolution of gas could be observed. The reaction flask was fitted with a mechanical stirrer, and 25 ml. of methyl alcohol was carefully added with stirring to decompose excess sodium hydride. The reaction mixture was poured into 1500 ml. of water and shaken. The layers were separated, and the aqueous layer was extracted with ether, cooled to ice bath temperature and acidified with concentrated hydrochloric acid containing ice. The solid product was collected by filtration, washed with water and dried at 60° C. for twenty-four hours in vacuo, giving 49.1 g. of 2-hydroxymethylene-17α-methyl-4-androsten-17β-ol-3-one. A sample when recrystallized from a methanol-water mixture had the M.P. 178.5–180° C. (corr.), [α]$_D^{23}$=+14.0° (1% in chloroform); ultraviolet maxima at 252 and 307 mμ (E=12,000 and 6,030).

Analysis.—Calcd. for C$_{21}$H$_{30}$O$_3$: C, 76.32; H, 9.15. Found: C, 76.36; H, 9.19.

(b) 17β - hydroxy-17α-methyl-4-androsteno[3,2-d]-2'-methylpyrimidine [VI; R is H, R' and R" are CH$_3$, X is H$_2$, Z is OH, Y and Y' are CH$_3$] can be prepared from 2 - hydroxymethylene - 17α-methyl-4-androsten-17β-ol-3-one and acetamidine according to the manipulative procedure described above in Example 1, part (b).

EXAMPLE 5

(a) 2 - hydroxymethylene-4-androsten-17β-ol-3-one was prepared from 25 g. of testosterone, 7.5 g. of sodium hydride and 25 ml. of ethyl formate in 500 ml. of dry benzene according to the manipulative procedure described above in Example 4, part (a). There was thus obtained 21.63 g. of 2-hydroxymethylene-4-androsten-17β-ol-3-one in crystalline form.

(b) 17β - acetoxy-4-androsteno[3.2-d]-2'-methylpyrimidine [VI; R and R' are H, R" is CH$_3$, X is H$_2$, Z is OCOCH$_3$, Y and Y' are CH$_3$].—A mixture of 3.16 g. of 2-hydroxymethylene-4-androsten-17β-ol-3-one, 1.15 g. of acetamidine hydrochloride, 1.73 ml. of triethylamine and 10 ml. of dimethylformamide was refluxed for two hours. The crude product was isolated in the manner described above in Example 1, part (b) and acetylated by heating for twelve minutes with 4 ml. of pyridine and 4 ml. of acetic anhydride. The acetylated product was purified by chromatography and repeated recrystallization from hexane to give 17β-acetoxy-4-androsteno [3.2-d]-2'-methylpyrimidine in the form of colorless prisms, M.P. 170.4–171.8° C. (corr.), [α]$_D^{25}$=+143.4° (1% in chloroform); ultraviolet maxima at 229, 256 and 302 mμ (E=11,700; 5,300 and 12,600).

Analysis.—Calcd. for C$_{24}$H$_{32}$N$_2$O$_2$: C, 75.75; H, 8.48; N, 7.36. Found: C, 75.60; H, 8.51; N, 7.43.

When measured by its effect upon the growth of the levator ani muscle in the rat, 17β-acetoxy-4-androsteno [3.2-d]-2'-methylpyrimidine was found to possess myotrophic activity.

17β - hydroxy-4-androsteno[3.2-d]-2'-methylpyrimidine (obtained as the initial reaction product above prior to acetylation) can be reacted with propionic anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, cinnamoyl chloride, p-chlorophenoxyacetyl chloride, or β-cyclohexylpropionic anhydride, by heating in the presence of pyridine, to give, respectively, 17β-propionoxy-4-androsteno[3.2-d]-2' - methylpyrimidine, 17β-caproyloxy-4-androsteno[3.2-d]-2'-methylpyrimidine, 17β - (β-carboxypropionoxy) - 4-androsteno[3.2-d]-2'-methylpyrimidine, 17β - (β-cyclopentylpropionoxy)-4-androsteno[3.2-d]-2'-methylpyrimidine, 17β - benzoyloxy-4-androsteno[3.2-d]-2' - methylpyrimidine, 17β - (p-nitrobenzoyloxy)-4 - androsteno[3.2-d] - 2'-methylpyrimidine, 17β-(3,4,5-trimethoxybenzoyloxy) - 4 - androsteno[3.2-d]-2'-methylpyrimidine, 17β - phenylacetoxy-4-androsteno[3.2-d]-2'-methylpyrimidine, 17β - cinnamoyloxy-4-androsteno[3.2-d]-2'-methylpyrimidine, 17β - (4 - chlorophenoxyacetoxy) - 4-androsteno[3.2-d]-2'-methylpyrimidine, or 17β-(β-cyclohexylpropionoxy) - 4-androsteno[3.2-d]-2'-methylpyrimidine.

EXAMPLE 6

Sodium ethoxide solution (from 0.69 g. of sodium and 20 ml. of absolute ethanol) was added to a mixture of 6.32 g. of 2-hydroxymethylene-4-androsten-17β-ol-3-one, 2.82 g. of acetamidine hydrochloride and 50 ml. of anhydrous ethanol. After one-half hour at room temperature, the mixture was heated to reflux for six hours. The basic fraction was isolated by the method described in Example 1, part (b) and the product purified by chromatography. The resulting 17β-hydroxy - 4 - androsteno-[3.2-d]-2'-methylpyrimidine was acetylated with acetic anhydride in pyridine to give a sample of 17β-acetoxy-4-androsteno[3.2-d]-2'-methylpyrimidine, M.P. 173–178° C. (uncorr.), the same compound as obtained in Example 5.

EXAMPLE 7

(a) 2-hydroxymethylene - 4 - pregnene-17α,21-diol-3,11,20-trione-17,20;20,21 - bismethylenedioxy derivative was prepared from 10.0 g. of 4-pregnene-17α,21-diol-3,11, 20-trione 17,20;20,21-bismethylenedioxy derivative, 17 ml. of ethyl formate, 1.3 g. of sodium hydride, 6 drops of methanol and 650 ml. of benzene according to the manipulative procedure described above in Example 4, part (a). There was thus obtained 9.3 g. of product which was used directly in the following reaction.

(b) 17,21 - dihydroxy - 11,20 - dioxo - 4 - pregneno-[3.2-d]pyrimidine - 17,20;20,21 - bismethylenedioxy derivative was prepared from 4.30 g. of 2-hydroxymethylene-4-pregnene - 17α,21 - diol-3,11,20-trione 17,20;20,21-bismethylenedioxy derivative, 1.25 g. of formamidine hydrochloride, 1.80 ml. of triethylamine and 15 ml. of dimethylformamide. The mixture was refluxed for two and one-half hours and worked up according to the manipulative procedure described above in Example 1, part (b). The product was recrystallized from methanol to give 17α,21-dihydroxy - 11,20 - dioxo-4-pregneno[3.2-d]-pyrimidine 17,20;20,21-bismethylenedioxy derivative, M.P. 283.0–291.4° C. (corr.).

Analysis.—Calcd. for $C_{25}H_{30}N_2O_5$: C, 68.47; H, 6.90; N, 6.39. Found: C, 68.20; H, 7.08; N, 6.24.

The bismethylenedioxy grouping can be cleaved by treating the compound with perchloric acid in acetic acid solution to yield 17α,21 - dihydroxy - 11,20 - dioxo-4-pregneno [3.2-d]pyrimidine [VI; R is H, R' is $COCH_2OH$, R" is H, X is O, Z is OH, Y and Y' are $CH_3$].

EXAMPLE 8

17α,21 - dihydroxy - 11,20 - dioxo - 4 - pregneno[3.2-d]-2' - methylpyrimidine 17,20;20,21-bismethylenedioxy derivative was prepared from 4.30 g. of 2-hydroxymethylene-4-pregnene - 17α,21-diol-3,11,20-trione 17,20;20,21-bismethylenedioxy derivative, 1.15 g. of acetamidine hydrochloride, 1.73 ml. of triethylamine and 10 ml. of dimethylformamide. The mixture was refluxed for one hour and worked up according to the manipulative procedure described above in Example 1, part (b). The product was recrystallized from an ethyl acetate-hexane mixture and then several times from methanl to give 17α,21-dihydroxy -11,20-dioxo-4-pregneno[3.2-d]2'-methylpyrimidine 17,20;20,21-bismethylenedioxy derivative, M.P. 217.2–221.2° C. (corr.).

Analysis.—Calcd. for $C_{26}H_{32}N_2O_5$: C, 69.00; H, 7.13; N, 6.19. Found: C, 68.86; H, 7.13; N, 5.91.

The bismethylenedioxy grouping can be cleaved by treating the compound with perchloric acid in acetic acid solution to yield 17α,21-dihydrovy-11,20-dioxo-4-pregneno [3.2-d]-2'-methylpyrimidine [VI; R is H, R' is $COCH_2OH$, R" is $CH_3$, X is O, Z is OH, Y and Y' are $CH_3$].

EXAMPLE 9

17β - hydroxy - 17α - methylandrostano[3.2-d] - 2'-ethylpyrimidine [V; R is H, R' is $CH_3$, R" is $C_2H_5$, X is $H_2$, Z is OH and Y and Y' are $CH_3$] can be prepared by replacement of the acetamidine hydrochloride in Example 1 by a molar equivalent amount of propionamidine hydrochloride.

EXAMPLE 10

17β - hydroxy - 17α - methylandrostano[3.2-d] - 2'-isopropylpyrimidine [V; R is H, R' is $CH_3$, R" is $(CH_3)_2CH$, X is $H_2$, Z is OH, Y and Y' are $CH_3$] can be prepared by replacement of the acetamidine hydrochloride in Example 1 by a molar equivalent amount of isobutyramidine hydrochloride.

EXAMPLE 11

17β - hydroxy - 17α - methylandrostano[3.2-d] - 2'-(n-butyl)pyrimidine [V; R is H, R' is $CH_3$, R" is $CH_3(CH_2)_3$, X is $H_2$, Z is OH, Y and Y' are $CH_3$] can be prepared by replacement of the acetamidine hydrochloride in Example 1 by a molar equivalent amount of n-valeramidine hydrochloride.

EXAMPLE 12

17β - hydroxy - 17α - methylandrostano[3.2-d] - 2'-(n-propyl)pyrimidine [V; R is H, R' is $CH_3$, R" is $CH_3(CH_2)_2$, X is $H_2$, Z is OH, Y and Y' are $CH_3$] can be prepared by replacement of the acetamidine hydrochloride in Example 1 by a molar equivalent amount of n-butyramidine hydrochloride.

EXAMPLE 13

(a) 2 - hydroxymethylene - 17α - ethyl - 4 - androsten-17β-ol-3-one was prepared from 17.19 g. of 17α-ethyl-4-androsten-17β-ol-3-one, 17 ml. of ethyl formate and 5 g. of sodium hydride in 350 ml. of benzene according to the manipulative procedure described above in Example 4, part (a). The acidic product was obtained in the form of a gum which was converted to its sodium salt and used directly in the next reaction without further purification.

(b) 17β - hydroxy - 17α - ethyl - 4 - androsteno[3.2-d]-2'-methylpyrimidine [VI; R is H, R' is $C_2H_5$, R" is $CH_3$, X is $H_2$, Z is OH, Y and Y' are $CH_3$] can be prepared by causing 2-hydroxymethylene - 17α - ethyl-4-androsten-17β-ol-3-one to react with acetamidine according to the manipulative procedure described above in Example 1, part (b).

EXAMPLE 14

(a) 2 - hydroxymethylene - 17α - vinyl - 4 - androsten-17β-ol-3-one.—A mixture of 12.04 g. of 17α-vinyl-4-androsten-17β-ol-3-one, 12 ml. of ethyl formate and 4.0 g. of sodium hydride in 300 ml. of benzene was kept at room temperature for three days under a nitrogen atmosphere. After this time about 2 g. of sodium methoxide was added and the reaction mixture allowed to stand for seven days longer. The reaction mixture was worked up according to the manipulative procedure described above in Example 4, part (a), giving 11.46 g. of 2-hydroxymethylene-17α-vinyl-4-androsten-17β-ol-3-one in semi-crystalline form.

(b) 17β - hydroxy - 17α - vinyl - 4 - androsteno[3.2-d]-2'-methylpyrimidine [VI; R is H, R' is $CH=CH_2$, R" is $CH_3$, X is $H_2$, Z is OH, Y and Y' are $CH_3$] can be prepared by causing 2-hydroxymethylene-17α-vinyl-4-androsten-17β-ol-3-one to react with acetamidine according to the manipulative procedure described above in Example 1, part (b).

EXAMPLE 15

(a) 2 - hydroxymethylene - 17α - methyletiocholan-17β-ol-3-one.—To 4.8 g. (0.2 mole) of sodium hydride suspended in 75 ml. of benzene was added 3.2 g. (0.1 mole) of methanol. After the reaction subsided, the mixture was heated to boiling, cooled, and treated with a mixture of 20.8 g. (0.068 mole) of 17α-methyletiocholan-17β-ol-3-one, 75 ml. of benzene, and 21 ml. of ethyl formate. The mixture was stirred vigorously for four hours, mixed with 200 ml. of water, and the layers were separated. The water layer was washed with ether and then acidified with hydrochloric acid. The resulting precipitate was collected by filtration and dried, giving 17.8 g. of 2-hydroxymethylene-17α-methyletiocholan-17β-ol-3-one, suitable for use in the succeeding reaction. A sample was further purified by chromatography on 100 g. of silica gel in an equal volume mixture of ether and pentane. The resulting solid was recrystallized from ether, giving colorless needles, M.P. 205.6–211.6° C. (corr.), $[\alpha]_D^{25}=+0.3\pm0.2°$ (1% in chloroform); ultraviolet maxima at 285 and 347 mμ (E=7,200 and 1,500).

Analysis.—Calcd. for $C_{21}H_{32}O_3$: C, 75.86; H, 9.70. Found: C, 75.69; H, 9.74.

(b) 17β - hydroxy - 17α - methyletiocholano[3.2-d]-2'-methylpyrimidine [V; R is H, R' and R" are $CH_3$, X is $H_2$, Z is OH, Y and Y' are $CH_3$ (rings A/B cis)] can be prepared by causing 2-hydroxymethylene-17α-methyletiocholan-17β-ol-3-one to react with acetamidine according to the manipulative procedure described above in Example 1, part (b).

EXAMPLE 16

(a) 2 - hydroxymethylene - 17α - methyl - 19 - norandrostan-17β-ol-3-one was prepared from 4.35 g. of 17α-methyl - 19-norandrostan-17β-ol-3-one [Bowers et al., J. Am. Chem. Soc. 79, 4556 (1957)], 10 ml. of ethyl formate and 2.40 g. of sodium hydride according to the manipulative procedure described above in Example 4, part (a). There was thus obtained 4.35 g. of 2-hydroxymethylene - 17α - methyl - 19-norandrostan-17β-ol-3-one, M.P. 190–200° C. (uncorr.).

(b) 17β - hydroxy - 17α - methyl - 19 - norandrostano [3.2-d]-2'-methylpyrimidine [V; R is H, R' and R" are $CH_3$, X is $H_2$, Z is OH, Y is H, Y' is $CH_3$] can be prepared by causing 2-hydroxymethylene-17α-methyl-19-norandrostan-17β-ol-3-one to react with acetamidine according to the manipulative procedure described above in Example 1, part (b).

EXAMPLE 17

(a) 17α - ethyl - 2 - hydroxymethyleneandrostan-17β-ol-3-one was prepared from 7.0 g. of 17α-ethylandrostan-17β-ol-3-one, 8 ml. of ethyl formate and 3.8 g. of sodium methoxide in 150 ml. of benzene according to the manipulative procedure described above in Example 1, part (a). The product was obtained in the form of the solid sodium salt and used directly in the next reaction.

(b) 17β - hydroxy - 17α - ethylandrostano[3.2-d]-2'-methylpyrimidine [V; R is H, R' is $C_2H_5$, R" is $CH_3$, X is $H_2$, Z is OH, Y and Y' are $CH_3$] can be prepared by causing 17α - ethyl - 2-hydroxymethylene-androstan-17β-ol-3-one to react with acetamidine according to the manipulative procedure described above in Example 1, part (b).

EXAMPLE 18

(a) Allopregnan - 3β - ol - 20 - one 20-ethylene glycol ketal.—A mixture of 27.4 g. (0.086 mole) of allopregnan-3β-ol-20-one, 33 ml. of ethylene glycol, 700 ml. of benzene and 1 g. of p-toluenesulfonic acid was refluxed for 78 hours with a water separator in the system. The reaction mixture was then cooled and shaken with 100 ml. of 2 N sodium hydroxide solution, and the resulting mixture was filtered to collect 20.5 g. of allopregnan-3β-ol-20-one 20-ethylene glycol ketal, M.P. 166–169° C. (uncorr.). When the latter was recrystallized from acetone, the compound was obtained in the form of colorless plates, M.P. 172.5–175° C. (uncorr.).

(b) Allopregnane-3,20-dione 20-ethylene glycol ketal.—Chromic oxide (26.6 g.) was added in small portions to 425 ml. of pyridine at 25–30° C. To this mixture was added all at once a solution of 19.5 g. (0.054 mole) of allopregnan-3β-ol-20-one 20-ethylene glycol ketal in 250 ml. of pyridine. The reaction mixture was stirred at room temperature for 18 hours, diluted with 1 liter of hot benzene and filtered. The filtered solid was washed with 500 ml. of hot benzene, and the combined filtrates were washed with four 500 ml. portions of water followed by one 200 ml. portion of saturated sodium chloride solution. The organic solvent was then concentrated in vacuo, and the residue was triturated with 50 ml. of methanol. Filtration of the mixture and concentration of the filtrate to a volume of 20 ml. gave a small additional amount of solid product. The combined solid product was recrystallized from ethyl acetate using activated charcoal for decolorizing purposes to give 12.6 g. of allopregnane-3,20-dione 20-ethylene glycol ketal in the form of blades and plates, M.P. 190–191.5° C. (uncorr.).

(c) 2 - hydroxymethyleneallopregnane - 3,20-dione 20-ethylene glycol ketal was prepared from 2.45 g. of allopregnane-3,20-dione 20-ethylene glycol ketal, 20 ml. of ethyl formate, and sodium methoxide (from 0.33 g. of sodium and 15 ml. of methanol) in 70 ml. of pyridine according to the manipulative procedure described below in Example 19, part (c). There was thus obtained 2.64 g. of 2 - hydroxymethyleneallopregnane-3,20-dione 20-ethylene glycol ketal, used in the next reaction without further purification.

(d) 20 - oxoallopregnano[3.2-d] - 2' - methylpyrimidine [V; R is H, R' is $COCH_3$, R" is $CH_3$, X is $H_2$, Z is H, Y and Y' are $CH_3$ (rings A/B trans)] can be prepared by causing 2-hydroxymethyleneallopregnane-3,20-dione 20-ethylene glycol ketal to react with acetamidine according to the manipulative procedure described above in Example 1, part (b), followed by heating with dilute acetic acid to cleave the ketal group.

EXAMPLE 19

(a) Pregnan-3α-ol-20-one 20-ethylene glycol ketal was prepared from 30 g. of pregnan-3α-ol-20-one, 30 g. of ethylene glycol, 0.9 g. of p-toluenesulfonic acid monohydrate and 700 ml. of benzene according to the manipulative procedure described above in Example 18, part (a). The resulting product was recrystallized twice from methanol with a few drops of pyridine added to give 25.6 g. of pregnan-3α-ol-20-one 20-ethylene glycol ketal in the form of colorless needles, M.P. 147.0–149.2° C. (corr.), $[\alpha]_D^{25} = +28.5 \pm 0.2°$ (1% in chloroform).

Analysis.—Calcd. for $C_{23}H_{38}O_3$: C, 76.19; H, 10.57. Found: C, 76.13; H, 10.75.

(b) Pregnane-3,20-dione 20-ethylene glycol ketal was prepared from 25.3 g. of pregnan-3α-ol-20-one 20-ethylene glycol ketal, 33 g. of chromic oxide and 630 ml. of pyridine according to the manipulative procedure described above in Example 18, part (b). The product was recrystallized from 400 ml. of methanol to give 17.5 g. of pregnane-3,20-dione 20-ethylene glycol ketal in the form of colorless leaflets, M.P. 169.8–172.8° C. (corr.), $[\alpha]_D^{25} = +32.0 \pm 0.1°$ (1% in chloroform).

Analysis.—Calcd. for $C_{23}H_{36}O_3$: C, 76.62; H, 10.07. Found: C, 76.93; H, 10.08.

(c) 2-hydroxymethylenepregnane-3,20-dione 20-ethylene glycol ketal.—Sodium methoxide was prepared by dissolving 0.73 g. (0.03 mole) of sodium hydride in 30 ml. of methanol and removing the excess methanol at 100° C. in vacuo. To the sodium methoxide were added 100 ml. of pyridine, 5.45 g. (0.0151 mole) of pregnane-3,20-dione 20-ethylene glycol ketal and then 30 ml. of ethyl formate. The reaction mixture was allowed to stand at room temperature for twenty-one hours and concentrated to dryness in vacuo below 45° C. The residue was dissolved in water, and carbon dioxide was passed into the solution until it reached a pH of 8. The precipitated product was collected by filtration and air dried, giving 5.9 g. of 2-hydroxymethylenepregnane-3,20-dione 20-ethylene glycol ketal, suitable for conversion to the pyrimidine derivative.

(d) 20 - oxopregnano[3.2-d]-2'-methylpyrimidine [V; R is H, R' is $COCH_3$, R" is $CH_3$, X is $H_2$, Z is H, Y and Y' are $CH_3$ (rings A/B cis)] can be prepared by causing 2-hydroxymethylenepregnane-3,20-dione 20-ethylene glycol ketal to react with acetamidine according to the manipulative procedure described above in Example 1, part (b), followed by heating with dilute acetic acid to cleave the ketal group.

Example 20

(a) 2-acetyl-17β-acetoxyandrostan-3-one.—A mixture of 9.6 g. (0.16 mole) of glacial acetic acid and 50 ml. of ethylene dichloride was cooled in an ice-bath, and dry boron trifluoride gas was passed into the solution until it was saturated. With continued addition of boron trifluoride, a solution of 11.60 g. (0.04 mole) of androstan-17β-ol-3-one and 12.2 g. (11.4 ml., 0.12 mole) of acetic anhydride in 75 ml. of ethylene dichloride was added. The reaction mixture was stirred in the ice-bath for thirty minutes and at room temperature for three hours, and then poured into a solution of 30 g. of sodium acetate trihydrate in 200 ml. of water. The organic solvent was distilled off, and the residue refluxed for forty-five minutes and diluted with water. The solid product was collected by filtration, suspended in 200 ml. of methanol containing 23 ml. of 35% sodium hydroxide solution with stirring, 25 ml. of water was added, and the solution allowed to stand for one hour. The solution was acidified with glacial acetic acid, the methanol removed in vacuo, and water was added to precipitate a gummy product. The latter was separated and dissolved in 25 ml. of acetic anhydride and 20 ml. of pyridine, and the solution was kept at room temperature and heated for one hour on a steam bath. The reaction mixture was added to cold, dilute sulfuric acid and the product collected, washed, dissolved in hot methanol, and the solution filtered. Water was added to the filtrate to the point of turbidity, and the product which separated upon cooling was collected and dried at 70° C.; yield 11.59 g., M.P. 132–158° C. (uncorr.). The latter was dissolved in in n-hexane and chromatographed on alumina. The fraction eluted with 20% ether in n-pentane was recrystallized from acetone and dried in vacuo at 110° C. for eight hours, giving 6.98 g. of 2-acetyl-17β-acetoxyandrostan-3-one, M.P. 183.0–184.6° C. (corr.), $$[\alpha]_D^{25} = +39.4 \pm 0.2°$$

(1% in chloroform); ultraviolet maximum at 290 mμ (E=9,100).

*Analysis.*—Calcd. for $C_{23}H_{34}O_4$: C, 73.76; H, 9.15. Found: C, 73.80; H, 9.55.

(b) *2-acetylandrostan-17β-ol-3-one.*—A solution of 2-acetyl - 17β - acetoxyandrostan - 3 - one in methanol was treated with an excess of 35% sodium hydroxide solution, and the mixture was allowed to stand at room temperature for one hour. The reaction mixture was neutralized with acetic acid and diluted with water, and the product was isolated and purified by chromatography on silica gel, giving 2-acetylandrostan-17β-ol-3-one, M.P. 149.6–154.0° C. (corr.), $[\alpha]_D^{25} = +62.3 \pm 0.1°$ (1% in chloroform), when recrystallized from an ethyl acetate-petroleum ether mixture.

(c) *17β - hydroxyandrostano[3.2-d] - 2',6' - dimethylpyrimidine* [V; R is $CH_3$, R' is H, R'' is $CH_3$, X is $H_2$, Z is OH, Y and Y' are $CH_3$] can be prepared by causing 2-acetylandrostan-17β-ol-3-one to react with acetamidine according to the manipulative procedure described above in Example 1, part (b).

*Example 21*

(a) *2-(n-butyryl)androstan-17β-ol-3-one* was prepared from 27.68 g. of 17β - (n - butyryloxy)androstan-3-one (M.P. 97–99° C.), 24.3 g. of n-butyric anhydride and 27.1 g. of n-butyric acid in the presence of boron trifluoride according to the manipulative procedure described above in Example 20, part (a). The initial product obtained, 2-(n-butyryl)-17β - (n-butyryloxy)androstan-3-one was saponified by treating a methanol solution of the compound with 35% sodium hydroxide at room temperature, and the resulting 17β-hydroxy compound was chromatographed on silica gel to give 25.14 g. of 2-(n-butyryl)androstan-17β-ol-3-one, M.P. 130.8–132.8° C. (corr.), colorless prisms from methanol, $$[\alpha]_D^{25} = +55.8 \pm 0.1°$$

(1% in chloroform); ultraviolet maximum at 290 mμ (E=9,470).

*Analysis.*—Calcd. for $C_{23}H_{36}O_3$: C, 76.62; H, 10.07. Found: C, 76.70; H, 10.10.

(b) *17β-hydroxyandrostano[3.2-d] - 2' - methyl-6'-(n-propyl)pyrimidine* [V; R is $(CH_2)_2CH_3$, R' is H, R'' is $CH_3$, X is $H_2$, Z is OH, Y and Y' are $CH_3$] can be prepared by causing 2-(n-butyryl)androstan-17β-ol-3-one to react with acetamidine according to the manipulative procedure described above in Example 1, part (b).

*Example 22*

(a) *2-hydroxymethylene - 4,6 - androstadien-17β-ol-3-one* was prepared from 12.41 g. of 4,6-androstadien-17β-ol-3-one, 14 ml. of ethyl formate and 3.9 g. of sodium hydride according to the manipulative procedure described above in Example 4, part (a). There was thus obtained 13.15 g. of 2-hydroxymethylene-4,6-androstadien-17β-ol-3-one, M.P. 80–100° C. (uncorr.).

(b) *17β - hydroxy-4,6-androstadieno[3.2-d]-2'-methylpyrimidine* [VII; R and R' are H, R'' is $CH_3$, X is $H_2$, Z is OH, Y and Y' are $CH_3$] can be prepared by causing 2-hydroxymethylene-4,6-androstadien-17β-ol-3-one to react with acetamidine according to the manipulative procedure described above in Example 1, part (b).

*Example 23*

(a) *2 - hydroxymethylene - 17α - methyl-4,6-androstadien-17β-ol-3-one* was prepared from 11.4 g. of 17α-methyl-4,6-androstadien-17β-ol-3-one, 12.0 ml. of ethyl formate and 3.7 g. of sodium hydride in 250 ml. of benzene according to the manipulative procedure described above in Example 4, part (a). There was thus obtained 5.3 g. of 2-hydroxymethylene-17α-methyl-4,6-androstadien-17β-ol-3-one, M.P. 117–123° C. (uncorr.).

(b) *17β-hydroxy-17α-methyl - 4,6 - androstadieno[3.2-d]-2'-methylpyrimidine* [VII; R is H, R' and R'' are $CH_3$, X is $H_2$, Z is OH, Y and Y' are $CH_3$] can be prepared by causing 2-hydroxymethylene - 17α - methyl-4,6-androstadien-17β-ol-3-one to react with acetamidine according to the manipulative procedure described above in Example 1, part (b).

EXAMPLE 24

(a) *2 - hydroxymethylene - 17α - ethyl - 4,6-androstadien-17β-ol-3-one* was prepared from 8.83 g. of 17α-ethyl-4,6-androstadien-17β-ol-3-one, 10 ml. of ethyl formate and 2.8 g. of sodium hydride in 200 ml. of benzene according to the manipulative procedure described above in Example 4, part (a). There was thus obtained 9.68 g. of 2 - hydroxymethylene - 17α - ethyl - 4,6-androstadien-17β-ol-3-one in the form of its sodium salt.

(b) *17 - hydroxy - 17α - ethyl - 4,6 - androstadieno-[3.2-d]-2'-methylpyridimidine* [VII; R is H, R' is $C_2H_5$, R'' is $CH_3$, X is $H_2$, Z is OH, Y and Y' are $CH_3$] can be prepared by causing 2-hydroxymethylene-17α-ethyl-4,6-androstadien-17β-ol-3-one to react with acetamidine according to the manipulative procedure described above in Example 1, part (b).

EXAMPLE 25

*17 - oxo - 4,6-androstadieno[3.2-d]-2'-methylpyrimidine* can be prepared by treating a solution of 17β-hydroxy-4,6-androstadieno[3.2-d]2'-methylpyrimidine [Example 22, part (b)] in glacial acetic acid with a solution of chromic oxide in aqueous acetic acid. The product is isolated by addition of water and collection of the resulting precipitate.

EXAMPLE 26

(a) *17α - ethynyl - 2 - hydroxymethylene - 4 - androsten-17β-ol-3-one.*—To a solution of 14.2 g. of 17α-ethynyl-4-androsten17β-ol-3-one in 300 ml. of dry pyridine was added 23 ml. of dry ethyl formate and then a solution of sodium ethoxide in ethanol (from 2.1 g. of sodium and 35 ml. of absolute ethanol). The reaction mixture was allowed to stand at room temperature for forty-two hours and then poured onto ice-water. Glacial acetic acid (218 ml.) was added and the gummy product was separated and dissolved in ether. The ether solution was washed with a solution of 30 g. of potassium hydroxide in 1.5 liters of water, and the aqueous layer was cooled to 5° C. and acidified with 6 N hydrochloric acid. The precipitated product was collected by filtration and dried in vacuo over phosphorus pentoxide at 60° C., giving 13.5 g. of 17α-ethynyl-2-hydroxymethylene-4-androsten-17β-ol-3-one.

(b) *17α - ethynyl - 17β - hydroxy - 4 - androsteno[3.2-d]-2'-methylpyrimidine* [VI; R is H, R' is C≡CH, R'' is $CH_3$, X is $H_2$, Z is OH, Y and Y' are $CH_3$] can be prepared by causing 17α-ethynyl-2-hydroxymethylene-4-androsten-17β-ol-3-one to react with acetamidine according to the manipulative procedure described above in Example 1, part (b).

EXAMPLE 27

(a) *2 - hydroxymethylene - 4 - pregnen - 20β - ol-3-one* was prepared from 4.97 g. of 4-pregnen-20β-ol-3-one, 5 ml. of ethyl formate and 1.0 g. of sodium hydride in 100 ml. of benzene according to the manipulative procedure described above in Example 4, part (a).

(b) *20β - hydroxy - 4 - pregneno[3.2 - d] - 2'-methylpyrimidine* [VI; R is H, R' is CH(OH)$CH_3$, R'' is $CH_3$, X is $H_2$, Z is H, Y and Y' are $CH_3$] can be prepared by causing 2-hydroxymethylene-4-pregnen-20β-ol-3-one to react with acetamidine according to the manipulative procedure described above in Example 1, part (b).

EXAMPLE 28

*20 - oxo - 4 - pregneno[3.2-d]-2'-methylpyrimidine* [VI; R is H, R' is COCH$_3$, R" is CH$_3$, X is H$_2$, Z is H, Y and Y' are CH$_3$] can be prepared by treating a solution of 20β-hydroxy-4-pregneno[3.2-d]-2'-methylpyrimidine in glacial acetic acid with a solution of chromic oxide in aqueous acetic acid.

EXAMPLE 29

(a) *2 - hydroxymethylene - 4,4,17α - trimethyl - 5 - androsten-17β-ol-3-one* was prepared from 6.2 g. of 4,4,17α-trimethyl-5-androsten-17β-ol-3-one, 16 ml. of ethyl formate and sodium methoxide (from 2.2 g. of sodium and 40 ml. of methanol) in 400 ml. of benzene according to the manipulative procedure described above in Example 1, part (a). There was thus obtained 5.54 g. of 2-hydroxymethylene-4,4,17α-trimethyl-5-androsten-17β-ol-3-one.

(b) *17β - hydroxy - 4,4,17α - trimethyl - 5 - androsteno-[3.2-d]-2'-methylpyrimidine* can be prepared by causing 2 - hydroxymethylene - 4,4,17α-trimethyl-5-androsten-17β-ol-3-one to react with acetamidine according to the manipulative procedure described above in Example 1, part (b).

EXAMPLE 30

(a) *2 - hydroxymethylene - 4,4 - dimethyl - 5 - androsten-17β-ol-3-one* was prepared from 6.69 g. of 4,4-dimethyl-5-androsten-17β-ol-3-one, 9.5 ml. of ethyl formate, 0.95 g. of sodium and 18–20 ml. of ethanol in 65 ml. of pyridine according to the manipulative procedure described above in Example 26, part (a). There was thus obtained 5.21 g. of 2-hydroxymethylene-4,4-dimethyl-5-androsten-17β-ol-3-one.

(b) *4,4 - dimethyl - 17β - hydroxy - 5 - androsteno[3.2-d]-2'-methylpyrimidine* can be prepared by causing 2-hydroxymethylene-4,4-dimethyl-5-androsten-17β-ol-3-one to react with acetamidine according to the manipulative procedure described above in Example 1, part (b).

EXAMPLE 31

(a) *2 - hydroxymethylene - 4,4,17α - trimethylandrostan-17β-ol-3-one* was prepared from 6 g. of 4,4,17α-trimethylandrostan-17β-ol-3-one, 10 ml. of ethyl formate, 0.85 g. of sodium and 15 ml. of ethanol in 125 ml. of pyridine according to the manipulative procedure described above in Example 26, part (a). There was thus obtained 5.0 g. of 2-hydroxymethylene-4,4,17α-trimethylandrostan-17β-ol-3-one, M.P. 150–154° C. (uncorr.).

(b) *4,4,17α - trimethyl - 17β - hydroxyandrostano[3.2-d]-2'-methylpyrimidine* can be prepared by causing 2-hydroxymethylene - 4,4,17α-trimethylandrostan-17β-ol-3-one to react with acetamidine according to the manipulative procedure described above in Example 1, part (b).

EXAMPLE 32

(a) *2 - hydroxymethylene - 6α,17α - dimethyl-4-androsten-17β-ol-3-one* was prepared from 5.0 g. of 6α,17α-dimethyl-4-androsten-17β-ol-3-one, 5.0 ml. of ethyl formate and 1.5 g. of sodium hydride in 100 ml. of benzene according to the manipulative procedure described above in Example 4, part (a).

(b) *6α,17α - dimethyl - 17β - hydroxy - 4 - androsteno-[3.2-d]-2'-methylpyrimidine* can be prepared by causing 2 - hydroxymethylene - 6α,17α - dimethyl-4-androsten-17β-ol-3-one to react with acetamidine according to the manipulative procedure described above in Example 1, part (b).

EXAMPLE 33

(a) *2 - hydroxymethylene - 4 - pregnene - 17α,21 - diol-3,11,20-trione* was prepared from 2.0 g. (0.005 mole) of 21-acetoxy-4-pregnen-17α-ol-3,11,20-trione (cortisone acetate) and 1.0 g. of sodium hydride in 100 ml. of pyridine according to the manipulative procedure described above in Example 26, part (a), all operations being carried out in a nitrogen atmosphere. In the process the 21-acetoxy group was saponified to give 1.3 g. of 2 - hydroxymethylene-4-pregnene-17α,21-diol-3,11,20-trione; ultraviolet maxima at 246 and 293 mμ (E=8,000 and 4,300), characteristic of the 2-hydroxymethylene-Δ$^4$-3-oxo grouping.

(b) *17α,21 - dihydroxy - 11,20 - dioxo - 4 - pregneno-[3.2 - d] - 2' - methylpyrimidine* [VI; R is H, R' is COCH$_2$OH, R" is CH$_3$, X is O, Z is OH, Y and Y' are CH$_3$] can be prepared by causing 2-hydroxymethylene-4-pregnene-17α,21-diol-3,11,20-trione to react with acetamidine according to the manipulative procedure described above in Example 1, part (b).

EXAMPLE 34

(a) *2 - hydroxymethylene - 17α - ethynylandrostan-17β-ol-one* was prepared from 7.54 g. of 17α-ethynylandrostan-17β-ol-one, 11.5 ml. of ethyl formate and sodium methoxide (from 1.10 g. of sodium and 20 ml. of methanol) in 250 ml. of pyridine according to the manipulative procedure described above in Example 26, part (a). The crude product had a melting point of 171–177.5° C. (uncorr.).

(b) *17β - hydroxy - 17α - ethynylandrostano[3.2 - d]-2'-methylpyrimidine* [V; R is H, R' is C≡CH, R" is CH$_3$, X is H$_2$, Z is OH, Y and Y' are CH$_3$] can be prepared by causing 2-hydroxymethylene-17α-ethynylandrostan-17β-ol-3-one to react with acetamidine according to the manipulative procedure described above in Example 1, part (b).

EXAMPLE 35

(a) *2 - hydroxymethylene - 17α - propargylandrostan-17β-ol-3-one* can be prepared by replacement of the 17α-methyl-4-androsten-17β-ol-3-one in Example 4, part (a) by a molar equivalent amount of 17α-propargylandrostan-17β-ol-3-one.

(b) *17β - hydroxy - 17α - propargylandrostano[3.2-d]-2'-methylpyrimidine* [V; R is H, R' is C≡CCH$_3$, R" is CH$_3$, X is H$_2$, Z is OH, Y and Y' are CH$_3$] can be prepared by causing 2-hydroxymethylene-17α-propargylandrostan-17β-ol-3-one to react with acetamidine according to the manipulative procedure described above in Example 1, part (b).

EXAMPLE 36

(a) *2 - hydroxymethylene - 4 - pregnene - 20,21 - diol-3-one* can be prepared by replacement of the 17α-methyl-4-androsten-17β-ol-3-one in Example 4, part (a) by a molar equivalent amount of 4-pregnene-20,21-diol-3-one.

(b) *20,21 - dihydroxy - 4 - pregneno[3.2 - d] - 2'-methylpyrimidine* [VI; R is H, R' is CH(OH)CH$_2$OH, R" is CH$_3$, X is H$_2$, Z is H, Y and Y' are CH$_3$] can be prepared by causing 2-hydroxymethylene-4-pregnene-20,21-diol-3-one to react with acetamidine according to the manipulative procedure described above in Example 1, part (b).

EXAMPLE 37

(a) *2 - hydroxymethylene - 9 - fluoro - 4 - pregnene-11β,17α,21-triol-3,20-dione 20-monoethylene glycol ketal* can be prepared by replacement of the 17α-methyl-4-androsten-17β-ol-3-one in Example 4, part (a) by a molar equivalent amount of 9-fluoro-4-pregnene-11β,17α,21-triol-3,20-dione 20-monoethylene glycol ketal.

(b) *9 - fluoro - 11β,17α,21 - trihydroxy - 20 - oxo - 4-pregneno[3.2-d]-2'-methylpyrimidine* can be prepared by causing 2-hydroxymethylene-9-fluoro-4-pregnene-11β,17α,21-triol-3,20-dione 20-monoethylene glycol ketal to react with acetamidine according to the manipulative procedure described above in Example 1, part (b), followed by heating with dilute acetic acid to cleave the ketal group.

EXAMPLE 38

(a) *2 - hydroxymethylene - 4 - pregnene - 16α,17α,21-triol - 3,20 - dione-9β,11β-oxide 20-monoethylene glycol ketal* can be prepared by replacement of the 17α-methyl-4-androsten-17β-ol-3-one in Example 4, part (a) by a molar equivalent amount of 4-pregnene-16α,17α,21-triol-3,20-dione-9β,11β-oxide 16α,21-diacetate 20-monoethylene glycol ketal.

(b) *16α,17α,21 - trihydroxy - 20 - oxo - 9β,11β - oxido-4-pregneno[3.2-d]-2'-methylpyrimidine* can be prepared by causing 2-hydroxymethylene-4-pregnene-16α,17α,21-triol-3,20-dione-9β,11β-oxide 20-monoethylene glycol to react with acetamidine according to the manipulative procedure described above in Example 1, part (b), followed by heating with dilute acetic acid to cleave the ketal group.

EXAMPLE 39

(a) *2 - formyl - 1,4 - pregnadiene - 17α,21 - diol - 3,11, 20-trione 20-monoethylene glycol ketal* can be prepared by replacement of the 17α-methyl-4-androsten-17β-ol-3-one in Example 4, part (a) by a molar equivalent amount of 1,4-pregnadiene-17α,21-diol-3,11,20-trione 20-monoethylene glycol ketal.

(b) *17α,21 - dihydroxy - 11,20 - dioxo - (1,3)5 - pregnatrieno[3.2-d]-2'-methylpyrimidine* can be prepared by causing 2-formyl-1,4-pregnadiene-17α,21-diol-3,11,20-trione 20-monoethylene glycol ketal to react with acetamidine according to the manipulative procedure described above in Example 1, part (b), followed by heating with dilute acetic acid to cleave the ketal group.

EXAMPLE 40

(a) *2 - hydroxymethylene - 17α - propynyl - 6 - methyl-4-androsten-17β-ol-3-one* can be prepared by replacement of the 17α-methyl-4-androsten-17β-ol-3-one in Example 4, part (a) by a molar equivalent amount of 17α-propynyl-6-methyl-4-androsten-17β-ol-3-one.

(b) *17β - hydroxy - 17α - propynyl - 6 - methyl - 4-androsteno[3.2-d]-2'-methylpyrimidine* can be prepared by causing 2-hydroxymethylene-17α-propynyl-6-methyl-4-androsten-17β-ol-3-one to react with acetamidine according to the manipulative procedure described above in Example 1, part (b).

EXAMPLE 41

(a) *2 - hydroxymethylene - 17α - methyl - 4 - androsten-17β-ol-3-one* in the form of the copper chelate (2.07 g., M.P. 205–220° C.) was brominated with 1.46 g. of bromine in 100 ml. of carbon tetrachloride to give 2-bromo - 2 - hydroxymethylene - 17α - methyl - 4 - androsten-17β-ol-3-one. The latter can be dehydrobrominated by heating with collidine to give 2-formyl-17α-methyl-1,4-androstadien-17β-ol-3-one.

(b) *17β - hydroxy - 17α - methyl - (1,3)5-androstatrieno[3.2-d]-2'-methylpyrimidine* can be prepared by causing 2-formyl-17α-methyl-1,4-androstadien-17β-ol-3-one to react with acetamidine according to the manipulative procedure described above in Example 1, part (b).

EXAMPLE 42

(a) *2-hydroxymethylene-4-pregnene-11β,17α,21 - triol-3,20-dione 20-monoethylene glycol ketal* can be prepared by replacement of the 17α-methyl-4-androsten-17β-ol-3-one in Example 4, part (a) by a molar equivalent amount of 21-acetoxy-4-pregnene-11β,17α - diol - 3,20 - dione 20-monoethylene glycol ketal (hydrocortisone acetate 20-monoethylene glycol ketal).

(b) *11β,17α,21-trihydroxy-20-oxo-4 - pregneno[3.2-d]-2'-methylpyrimidine* [VI; R is H, R' is COCH₂OH, R" is CH₃, X is (H)(OH), Z is OH, Y and Y' are CH₃] can be prepared by causing 2-hydroxymethylene-4-pregnene-11β,17α,21-triol-3,20-dione 20-monoethylene glycol ketal to react with acetamidine according to the manipulative procedure described above in Example 1, part (b), followed by heating with dilute acetic acid to cleave the ketal group.

EXAMPLE 43

(a) *2-hydroxymethylene-46 - pregnadiene - 17α,21-diol-3,11,20-trione20-monoethylene glycol ketal* can be prepared by replacement of the 17α-methyl-4-androsten-17β-ol-3-one in Example 4, part (a) by a molar equivalent amount of 21-acetoxy-4,6-pregnadien-17α-ol-3,11,20-trione 20-monoethylene glycol ketal.

(b) *17α,21-dihydroxy-11,20 - dioxo - 4,6 - pregnadieno-[3.2-d]-2'-methylpyrimidine* [VII; R is H, R' is

COCH₂OH

R" is CH₃, X is O, Z is OH, Y and Y' are CH₃] can be prepared by causing 2-hydroxymethylene-4,6-pregnadiene-17α,21-diol-3,11,20-trione 20-monoethylene glycol ketal to react with acetamidine according to the manipulative procedure described above in Example 1, part (b), followed by heating with dilute acetic acid to cleave the ketal group.

EXAMPLE 44

(a) *2-hydroxymethylene-4-pregnene-17α-21-diol - 3,20-dione 20-monoethylene glycol ketal* can be prepared by replacement of the 17α-methyl-4-androsten-17β-ol-3-one in Example 4, part (a) by a molar equivalent amount of 21-acetoxy-4-pregnene-17α-ol-3,20-dione 20-monoethylene glycol ketal.

(b) *17α,21-dihydroxy-20 - oxo - 4 - pregneno[3.2d]-2'-methylpyrimidine* [VI; R is H, R' is COCH₂OH, R" is CH₃, X is H₂, Z is OH, Y and Y' are CH₃] can be prepared by causing 2-hydroxymethylene-4-pregnene-17α,21-3,20-dione 20-monoethylene glycol ketal to react with acetamidine according to the manipulative procedure described above in Example 1, part (b), followed by heating with dilute acetic acid to cleave the ketal group.

EXAMPLE 45

(a) *2-hydroxymethylene-6-methyl-4-pregnene - 17α,21-diol-3,11,20-trione 20-monoethylene glycol ketal* can be prepared by replacement of the 17α-methyl-4-androsten-17β-ol-3-one in Example 4, part (a) by a molar equivalent amount of 21-acetoxy-6-methyl-4-pregnen-17α-ol-3,11,20-trione 20-monoethylene glycol ketal.

(b) *17α, 21-dihydroxy-11,20-dioxo-6-methyl - 4 - pregneno[3.2-d]-2'-methylpyrimidine* can be prepared by causing 2-hydroxymethylene-6-methyl-4-pregnene-17α,21-diol-3,11,20-trione 20-monoethylene glycol ketal to react with acetamidine according to the manipulative procedure described above in Example 1, part (b), followed by heating with dilute acetic acid to cleave the ketal group.

EXAMPLE 46

(a) *2-hydroxymethylene-9-fluoro-6-methyl-4-pregnene-17α,21-diol-3,11,20-trione 20-monoethylene glycol ketal* can be prepared by replacement of the 17α-methyl-4-androsten-17β-ol-3-one in Example 4, part (a) by a molar equivalent amount of 21-acetoxy-9-fluoro-6-methyl-4-pregnen-17α-ol-3,11,20-trione 20 - monoethylene glycol ketal.

(b) *17α,21-dihydroxy-11,20-dioxo-9-fluoro-6-methyl-4-pregneno[3.2-d]-2'-methylpyrimidine* can be prepared by causing 2-hydroxymethylene-9-fluoro - 6 - methyl-4-pregnene-17α-21-diol-3,11,20-trione 20-monoethylene glycol ketal to react with acetamidine according to the manipulative procedure described above in Example 1, part (b), followed by heating with dilute acetic acid to cleave the ketal group.

EXAMPLE 47

(a) *2-hydroxymethylene-4-pregnene - 11β,16α,17α,21-tetrol-3,20-dione 20-monoethylene glycol ketal* can be prepared by replacement of the 17α-methyl-4-androsten-17β-ol-3-one in Example 4, part (a) by a molar equivalent amount of 21-acetoxy-4-pregnene-11β,16α,17α-triol-3,20-dione 20-monoethylene glycol ketal.

(b) *11β,16α,17α,21-tetrahydroxy-20-oxo - 4 - pregneno-[3.2-d]-2'-methylpyrimidine* can be prepared by causing 2-hydroxymethylene-4 - pregnene - 11β,16α,17α,21-tetrol-3,20-dione 20-monoethylene glycol ketal to react with acetamidine according to the manipulative procedure described above in Example 1, part (b), followed by heating with dilute acetic acid to cleave the ketal group.

EXAMPLE 48

(a) 2-hydroxymethylene - 4 - pregnene-16α,17α,21-triol-3,11,20-trione 20-monoethylene glycol ketal can be prepared by replacement of the 17α-methyl-4-androsten-17β-ol-3-one in Example 4, part (a) by a molar equivalent amount of 21-acetoxy-4-pregnene-16α,17α - diol - 3,11,20-trione 20-monoethylene glycol ketal.

(b) 16α,17α,21-trihydroxy-11,20-dioxo-4-pregneno[3.2-d]-2'-methylpyrimidine can be prepared by causing 2-hydroxymethylene-4-pregnene-16α,17α,21-triol - 3,11,20-trione 20-monoethylene glycol ketal to react with acetamidine according to the manipulative procedure described above in Example 1, part (b), followed by heating with dilute acetic acid to cleave the ketal group.

EXAMPLE 49

(a) 2-hydroxymethylene-4,17(20)-pregnadiene-11β,21-diol-3-one can be prepared by replacement of the 17α-methyl-4-androsten-17β-ol-3-one in Example 4, part (a) by a molar equivalent amount of 4,17(20)-pregnadiene-11β,21-diol-3-one.

(b) 11β,21-dihydroxy-4,17(20)-pregnadieno[3.2-d]-2'-methylpyrimidine can be prepared by causing 2-hydroxymethylene-4,17(20)-pregnadiene-11β,21-diol-3-one to react with acetamidine according to the manipulative procedure described above in Example 1, part (b).

EXAMPLE 50

11β,17α,21-trihydroxy-20 - oxo - 4 - pregneno[3.2-d]-2'-methylpyrimidine can be caused to react with p-toluene-sulfonyl chloride in pyridine under mild conditions to give 21-tosyloxy-11β,17α-dihydroxy-20-oxo - 4 - pregneno[3.2-d]-2'-methylpyrimidine. The latter can be caused to react with sodium bromide, sodium iodide, sodium chloride or sodium thiocyanate to give, respectively, 21-bromo, 21-iodo, 21-chloro or 21-thiocyano derivatives of 11β,17α-dihydroxy-20-oxo-4-pregneno[3.2-d]-2'-methylpyrimidine.

EXAMPLE 51

(a) 2-hydroxymethyleneandrostane-6β,17β-diol - 3 - one can be prepared by replacement of the 17α-methyl-4-androsten-17β-ol-3-one in Example 4, part (a) by a molar equivalent amount of androstane-6β,17β-diol-3-one.

(b) 6β,17β-dihydroxyandrostano[3.2-d]-2'-methylpyrimidine can be prepared by causing 2-hydroxymethylene-androstane-6-β,17β-diol-3-one to react with acetamidine according to the manipulative procedure described above in Example 1, part (b).

EXAMPLE 52

(a) 2-hydroxymethylene-17α-ethynyl-4-androsten-17β-ol-3,11-dione can be prepared by replacement of the 17α-methyl-4-androsten-17β-ol-3-one in Example 4, part (a) by a molar equivalent amount of 17α-ethynyl-4-androsten-17β-ol-3,11-dione.

(b) 17α - ethynyl - 17β - hydroxy - 11 - oxo - 4 - androsteno[3.2-d]-2'-methylpyrimidine [VI; R is H, R' is C≡CH, R'' is $CH_3$, X is O, Z is OH, Y and Y' are $CH_3$] can be prepared by causing 2-hydroxymethylene-17α-ethynyl-4-androsten-17β-ol-3,11-dione to react with acetamidine according to the manipulative procedure described above in Example 1, part (b).

EXAMPLE 53

(a) 2 -hydroxymethylene-17α - methyl - 4 - androsten-17β-ol-3,11-dione can be prepared by replacement of the 17α-methyl-4-androsten-17β-ol-3-one in Example 4, part (a) by a molar equivalent amount of 17α-methyl-4-androsten-17β-ol-3,11-dione.

(b) 17β - methyl - 17β - hydroxy - 11 - oxo - 4 - androsteno[3.2-d]-2'-methylpyrimidine [VI; R is H, R' and R'' are $CH_3$, X is O, Z is OH, Y and Y' are $CH_3$] can be prepared by causing 2-hydroxymethylene-17α-methyl-4-androsten-17β-ol-3,11-dione to react with acetamidine according to the manipulative procedure described above in Example 1, part (b).

EXAMPLE 54

(a) 2 - hydroxymethylene - 4 - androsten - 17β - ol-3,11-dione can be prepared by replacement of the 17α-methyl-4-androsten-17β-ol-3-one in Example 4, part (a) by a molar equivalent amount of 4-androsten-17β-ol-3,11-dione.

(b) 17β - hydroxy - 11 - oxo - 4 -androsteno [3.2-d]-2'-methylpyrimidine [VI; R and R' are H, R'' is $CH_3$, X is O, Z is OH, Y and Y' are $CH_3$] can be prepared by causing 2-hydroxymethylene-4-androsten-17β-ol-3,11-dione to react with acetamidine according to the manipulative procedure described above in Example 1, part (b).

EXAMPLE 55

(a) 2 - hydroxymethylene- 4 - androstene - 6β,17β-diol-3-one can be prepared by replacement of the 17α-methyl-4-androsten-17β-ol-3-one in Example 4, part (a) by a molar equivalent amount of 4-androstene-6β,17β-diol-3-one.

(b) 6β,17β - dihydroxy - 4 - androsteno [3.2-d]-2'-methylpyrimidine can be prepared by causing 2-hydroxymethylene-4-androstene-6β,17β-diol-3-one to react with acetamidine according to the manipulative procedure described above in Example 1, part (b).

EXAMPLE 56

(a) 2 - hydroxymethylene - 17α - methyl - 4 - androstene-6],17β-diol-3-one can be prepared by replacement of the 17α-methyl-4-androsten-17β-ol-3-one in Example 4, part (a) by a molar equivalent amount of 17α-methyl-4-androstene-6β,17β-diol-3-one.

(b) 17α - methyl - 6β,17β - dihydroxy - 4 - androsteno[3.2-d]-2'-methylpyrimidine can be prepared by causing 2 -hydroxymethylene - 17α - methyl - 4 androstene - 6β,17β-diol-3-one to react with acetamidine according to the manipulative procedure described above in Example 1, part (b).

EXAMPLE 57

(a) 2 - hydroxymethylene - 4 - androstene - 14α,17β-diol-3-one can be prepared by replacement of the 17α-methyl-4-androsten-17β-ol-3-one in Example 4, part (a) by a molar equivalent amount of 4-androstene-14α,17β-diol-3-one.

(b) 14α,17β -dihydroxy - 4 - androsteno[3.2-d]-2'-methylpyrimidine can be prepared by causing 2-hydroxymethylene-4-androstene-14α,17β-diol-3-one to react with acetamidine according to the manipulative procedure described above in Example 1, part (b).

EXAMPLE 58

(a) 2 -hydroxymethylene - 16β - methyl - 4 - androsten-17β-ol-3-one can be prepared by replacement of the 17α-methyl-4-androsten-17β-ol-3-one in Example 4, part (a) by a molar equivalent amount of 16β-methyl-4-androsten-17β-ol-3-one.

(b) 16β - methyl - 17β - hydroxy - 4 - androsteno [3.2-d]-2'-methylpyrimidine can be prepared by causing 2 - hydroxymethylene - 16β - methyl - 4 -androsten - 17β-ol-3-one to react with acetamidine according to the manipulative procedure described above in Example 1, part (b).

EXAMPLE 59

(a) 2 - hydroxymethylene - 4 - androstene - 11α,17β-diol-3-one can be prepared by replacement of the 17α-methyl-4-androsten-17β-ol-3-one in Example 4, part (a) by a molar equivalent amount of 4-androstene-11α,17β-diol-3-one.

(b) 11α,17β -dihydroxy - 4 - androsteno[3.2-d]-2'-methylpyrimidine [VI; R and R' are H, R'' is $CH_3$, X is (H)(OH), Z is OH, Y and Y' are $CH_3$] can be prepared by causing 2-hydroxymethylene-4-androstene-11α,17β-diol-3-one to react with acetamidine according to the manipulative procedure described above in Example 1, part (b).

EXAMPLE 60

(a) 2-hydroxymethylene - 19 - nor - 4 - androstene-6β,17β-diol-3-one can be prepared by replacement of the 17α-methyl-4-androsten-17β-ol-3-one in Example 4, part (a) by a molar equivalent amount of 19-nor-4-androstene-6β,17β-diol-3-one.

(b) 6β,17β - dihydroxy - 19 - nor - 4 -androsteno[3.2-d]-2'-methylpyrimidine can be prepared by causing 2-hydroxymethylene - 19 - nor - 4 - androstene - 6β,17β-diol-3-one to react with acetamidine according to the manipulative procedure described above in Example 1, part (b).

EXAMPLE 61

(a) 2-hydroxymethylene - 4 - bromo - 17α - methyl-4-androsten-17β-ol-3-one can be prepared by replacement of the 17α-methyl-4-androsten-17β-ol-3-one in Example 4, part (a) by a molar equivalent amount of 4-bromo-17α-methyl-4-androsten-17β-ol-3-one.

(b) 4 - bromo 17α - methyl - 17β - hydroxy - 4 - androsteno[3.2-d]-2'-methylpyrimidine can be prepared by causing 2 - hydroxymethylene - 4 - bromo - 17α - methyl-4-androsten-17β-ol-3-one to react with acetamidine according to the manipulative procedure described above in Example 1, part (b).

EXAMPLE 62

(a) 2-hydroxymethylene-4-methyl-4 - androsten - 17β-ol-3-one can be prepared by replacement of the 17α-methyl-4-androsten-17β-ol-3-one in Example 4, part (a) by a molar equivalent amount of 4-methyl-4-androsten-17β-ol-3-one.

(b) 4 - methyl - 17β - hydroxy - 4 - androsteno[3.2-d]-2'-methylpyrimidine can be prepared by causing 2-hydroxymethylene-4-methyl-4-androsten-17β-ol-3-one to react with acetamidine according to the manipulative procedure described above in Example 1, part (b).

EXAMPLE 63

(a) 2 - hydroxymethylene - 4,17α - dimethyl - 4 - androsten-17β-ol-3-one can be prepared by replacement of the 17α-methyl-4-androsten-17β-ol-3-one in Example 4, part (a) by a molar equivalent amount of 4,17α-dimethyl-4-androsten-17β-ol-3-one.

(b) 4,17α - dimethyl - 17β - hydroxy - 4 - androsteno[3.2-d] - 2' - methylpyrimidine can be prepared by causing 2 - hydroxymethylene - 4,17α - dimethyl - 4 - androsten-17β-ol-3-one to react with acetamidine according to the manipulative procedure described above in Example 1, part (b).

EXAMPLE 64

(a) 2 - hydroxymethylene - 17α - ethynyl - 4,6 - androstadien-17β-ol-3-one can be prepared by replacement of the 17α-methyl-4-androsten-17β-ol-3-one in Example 4, part (a) by a molar equivalent amount of 17α-ethynyl-4,6-androstadien-17β-ol-3-one.

(b) 17α - ethynyl - 17β - hydroxy - 4,6 - androstadieno[3.2-d]-2'-methylpyrimidine [VII; R is H, R' is C≡CH, R'' is CH₃, X is H₂, Z is OH, Y and Y' are CH₃] can be prepared by causing 2-hydroxymethylene17α-ethynyl-4,6-androstadien-17β-ol-3-one to react with acetamidine according to the manipulative procedure described above in Example 1, part (b).

EXAMPLE 65

(a) 2 - hydroxymethyleneallopregnane - 6β,17α,21-triol-3,20-dione 20-monoethylene glycol ketal can be prepared by replacement of the 17α-methyl-4-androsten-17β-ol-3-one in Example 4, part (a) by a molar equivalent amount of allopregnane-6β,17α,21-triol-3,20-dione 20-monoethylene glycol ketal.

(b) 6β,17α,21 - trihydroxy -20 - oxoallopregnano-[3.2-d]-2'-methylpyrimidine can be prepared by causing 2 - hydroxymethyleneallopregnane - 6β,17α,21 - triol-3,20-dione 20-monoethylene glycol ketal to react with acetamidine according to the manipulative procedure described above in Example 1, part (b), followed by heating with dilute hydrochloric acid to cleave the ketal group.

EXAMPLE 66

(a) 2 - hydroxymethylene - 4 - pregnene - 12α,17α,21-triol-3,20-dione 20-monoethylene glycol ketal can be prepared by replacement of the 17α-methyl-4-androsten-17β-ol-3-one in Example 4, part (a) by a molar equivalent amount of 21-acetoxy-4-pregnene-12α,17α-diol-3,20-dione 20-monoethylene glycol ketal.

(b) 12α,17α,21 - trihydroxy - 20 - oxo - 4 - pregneno-[3.2-d]-2'-methylpyrimidine can be prepared by causing 2 - hydroxymethylene - 4 - pregnene - 12α,17α,21 - triol-3,20-dione 20-monoethylene glycol ketal to react with acetamidine according to the manipulative procedure described above in Example 1, part (b), followed by heating with dilute acetic acid to cleave the ketal group.

EXAMPLE 67

(a) 2 - hydroxymethyleneallopregnane - 17α,21 - diol-3,12,20-trione 20-monoethylene glycol ketal can be prepared by replacement of the 17α-methyl-4-androsten-17β-ol-3-one in Example 4, part (a) by a molar equivalent amount of 21-acetoxyallopregnan-17α-ol-3,12,20-trione 20-monoethylene glycol ketal.

(b) 17α,21 - dihydroxy - 12,20 - dioxoallopregnano-[3.2-d]-2'-methylpyrimidine can be prepared by causing 2 - hydroxymethylallopregnane - 17α,21 - diol - 3,12,20-trione 20-monoethylene glycol ketal to react with acetamidine according to the manipulative procedure described above in Example 1, part (b), followed by heating with dilute acetic acid to cleave the ketal group.

EXAMPLE 68

(a) 2 - hydroxymethylene - 4,11 - pregnadiene -3,20-dione 20-monoethylene glycol ketal can be prepared by replacement of the 17α-methyl-4-androsten-17β-ol-3-one in Example 4, part (a) by a molar equivalent amount of 4,11-pregnadiene-3,20 - dione 20 - monoethylene glycol ketal.

(b) 20 - oxo - 4,11 - pregnadieno[3.2-d]-2'-methylpyrimidine can be prepared by causing 2-hydroxymethylene-4,11-pregnadiene-3,20-dione 20-monoethylene glycol ketal to react with acetamidine according to the manipulative procedure described above in Example 1, part (b), followed by heating with dilute acetic acid to cleave the ketal group.

EXAMPLE 69

(a) 2 - hydroxymethylene - 4 - pregnen - 17α - ol-3,20-dione 20-monoethylene glycol ketal can be prepared by replacement of the 17α-methyl-4-androsten-17β-ol-3-one in Example 4, part (a) by a molar equivalent amount of 4-pregnen-17α-ol-3,20-dione 20-monoethylene glycol ketal.

(b) 17α - hydroxy - 20 - oxo - 4 - pregneno[3.2-d]-2'-methylpyrimidine [VI; R is H, R' is COCH₃, R'' is CH₃, X is H₂, Z is OH, Y and Y' are CH₃] can be prepared by causing 2-hydroxymethylene-4-pregnen-17α-ol-3,20-dione 20-monoethylene glycol ketal to react with acetamidine according to the manipulative procedure described above in Example 1, part (b), followed by heating with dilute acetic acid to cleave the ketal group.

EXAMPLE 70

(a) 2 - hydroxymethylene 17α - methyl - 4 - pregnene-3,20-dione 20-monoethylene glycol ketal can be prepared by replacement of the 17α-methyl-4-androsten-17β-ol-3-one in Example 4, part (a) by a molar equivalent amount of 17α-methyl-4-pregnene-3,20-dione 20-monoethylene glycol ketal.

(b) 17α - methyl - 20 - oxo - 4 - pregneno[3.2-d] - 2'-methylpyrimidine can be prepared by causing 2-hydroxymethylene-17α-methyl-4-pregnene-3,20-dione 20 - monoethylene glycol ketal to react with acetamidine according to the manipulative procedure described in Example 1, part (b), followed by heating with dilute acetic acid to cleave the ketal group.

EXAMPLE 71

(a) 2 - hydroxymethylene - 4 - pregnen - 6β - ol - 3,20-dione 20-monoethylene glycol ketal can be prepared by replacement of the 17α - methyl - 4 - androsten - 17β-ol-3-one in Example 4, part (a) by a molar equivalent amount of 4-pregnen-6β-ol-3,20-dione 20-monoethylene glycol ketal.

(b) 6β - hydroxy - 20 - oxo - 4 - pregneno[3.2-d]-2'-methylpyrimidine can be prepared by causing 2-hydroxymethylene-4-pregnen-6β-ol-3,20-dione 20 - monoethylene glycol ketal to react with acetamidine according to the manipulative procedure described above in Example 1, part (b), followed by heating with dilute acetic acid to cleave the ketal group.

EXAMPLE 72

(a) 2 - hydroxymethylene - 4 - pregnene - 7β,11β - diol-3,20-dione 20-monoethylene glycol ketal can be prepared by replacement of the 17α-methyl-4-androsten-17β-ol-3-one in Example 4, part (a) by a molar equivalent amount of 4-pregnene-7β,11β-diol-3,20-dione 20 - monoethylene glycol ketal.

(b) 7β,11β-dihydroxy-20-oxo - 4 - pregneno[3.2-d]-2'-methylpyrimidine can be prepared by causing 2-hydroxymethylene-4-pregnene-7β,11β-diol - 3,20 - dione 20-monoethylene glycol ketal to react with acetamidine according to the manipulative procedure described above in Example 1, part (b), followed by heating with dilute acetic acid to cleave the ketal group.

EXAMPLE 73

(a) 2-hydroxymethylene - 12α - chloro-4-pregnene-17α, 21-diol-3,11,20-trione 20-monoethylene glycol ketal can be prepared by preplacement of the 17α-methyl-4-androsten-17β-ol-3-one in Example 4, part (a) by a molar equivalent amount of 12α-chloro-4-pregnene-17α,21-diol-3,11,20-trione 20-monoethylene glycol ketal.

(b) 12α - chloro-17α,21-dihydroxy-11,20-dioxo-4-pregneno[3.2-d]-2'-methylpyrimidine can be prepared by causing 2 - hydroxymethylene-12α-chloro-4-pregnene-17α, 21-diol-3,11,20-trione 20-monoethylene glycol ketal to react with acetamidine according to the manipulative procedure described above in Example 1, part (b), followed by heating with dilute acetic acid to cleave the ketal group.

EXAMPLE 74

(a) 2-hydroxymethylene-18,19-bisnor-4-pregnene-3,20-dione 20-monoethylene glycol ketal can be prepared by replacement of the 17α-methyl-4-androsten-17β-ol-3-one in Example 4, part (a) by a molar equivalent amount of 18,19-bisnor-4-pregnene-3,20-dione 20-monoethylene glycol ketal.

(b) 20 - oxo-18,19-bisnor-4-pregneno[3.2-]-2'-methylpyrimidine [VI; R is H, R' is COCH$_3$, R'' is CH$_3$, X is H$_2$, Z is H, Y and Y' are H] can be prepared by causing 2 - hydroxymethylene - 18,19 - bisnor - 4 - pregnene - 3,20-dione 20-monoethylene glycol ketal to react with acetamidine according to the manipulative procedure described above in Example 1, part (b), followed by heating with dilute acetic acid to cleave the ketal group.

EXAMPLE 75

(a) 2 - hydroxymethylene-4-bromo-4-pregnene-17α,21-diol-3,11,20-trione 20-monoethylene glycol ketal can be prepared by replacement of the 17α-methyl-4-androsten-17β-ol-3-one in Example 4, part (a) by a molar equivalent amount of 21-acetoxy-4-bromo-4-pregnen-17α-ol-3, 11,20-trione 20-monoethylene glycol ketal.

(b) 4-bromo - 17α,21 - dihydroxy-11,20-dioxo-4-pregneno[3.2-d]-2'-methylpyrimidine can be prepared by causing 2-hydroxymethylene-4-bromo-4-pregnene-17α,21-diol-3,11,20-trione 20-monoethylene glycol ketal to react with acetamidine according to the manipulative procedure described above in Example 1, part (b), followed by heating with dilute acetic acid to cleave the ketal group.

EXAMPLE 76

(a) 2 - hydroxymethylene-4-pregnene-7α,12α-diol-3,20-dione 20-monoethylene glycol ketal can be prepared by replacement of the 17α-methyl-4-androsten-17β-ol-3-one in Example 4, part (a) by a molar equivalent amount of 4-pregnene-7α,12α-diol-3,20-dione 20-monoethylene glycol ketal.

(b) 7α,12α-dihydroxy - 20 - oxo - 4 - pregneno[3.2-d]-2'-methylpyrimidine can be prepared by causing 2-hydroxymethylene - 4 - pregnene - 7α,12α - diol - 3,20 - dione 20-monoethylene glycol ketal to react with acetamidine according to manipulative procedure described above in Example 1, part (b), followed by heating with dilute acetic acid to cleave the ketal group.

EXAMPLE 77

(a) 2 - hydroxymethyleneallopregnane - 3,7,20 - trione 7,20-bis(ethylene glycol ketal) can be prepared by replacement of the 17α-methyl-4-androsten-17β-ol-3-one in Example 4, part (a) by a molar equivalent amount of allopregnane-3,7,20-trione 7,20-bis(ethylene glycol ketal) (prepared by ketalization of allopregnan-3β-ol-7,20-dione and oxidation by the Oppenauer procedure).

(b) 7,20-dioxoallopregnano[3.2-d] - 2' - methylpyrimidine can be prepared by causing 2-hydroxymethylene-allopregnane-3,7,20-trione 7,20-bis(ethylene glycol ketal) to react with acetamidine according to the manipulative procedure described above in Example 1, part (b), followed by heating with dilute acetic acid to cleave the ketal groups.

EXAMPLE 78

(a) 2-formyl-9α-fluoro-16α-methyl - 1,4 - pregnadiene-11β,17α,21-triol-3,20-dione 20-monoethylene glycol ketal can be prepared by replacement of the 17α-methyl-4-androsten-17β-ol-3-one in Example 4, part (a) by a molar equivalent amount of 9α-fluoro-16α-methyl-1,4-pregnadiene-11β,17α,21-triol-3,20-dione 20-monoethylene glycol ketal.

(b) 9α-fluoro-16α-methyl - 11β,17α,21 - trihydroxy-20-oxo-(1,3)5-pregnatrieno[3.2-d]-2'-methylpyrimidine can be prepared by causing 2-formyl-9α-fluoro-16α-methyl-1, 4-pregnadiene-11β,17α21-triol-3,20-dione 20 - monoethylene glycol ketal to react with acetamidine according the manipulative procedure described above in Example 1, part (b), followed by heating with dilute acetic acid to cleave the ketal group.

EXAMPLE 79

(a) 2 - formyl-6α,9α-difluoro-1,4-pregnadiene-11β,17α, 21-triol-3,20-dione 20-monoethylene glycol ketal can be prepared by replacement of the 17α-methyl-4-androsten-17β-ol-3-one in Example 4, part (a) by a molar equivalent amount of 6α,9α-difluoro-1,4-pregnadiene-11β,17α, 21-triol-3,20-dione 20-monoethylene glycol ketal.

(b) 6α,9α-difluoro-11β,17α,21-trihydroxy-20-oxo-(1,3)-5-pregnatrieno[3.2-d] - 2' - methylpyrimidine can be prepared by causing 2 - formyl - 6α,9α - difluoro-1,4-pregnadiene-11β,17α,21-triol-3,20-dione 20-monoethylene glycol ketal to react with acetamidine according to the manipulative procedure described above in Example 1, part (b), followed by heating with dilute acetic acid to cleave the ketal group.

EXAMPLE 80

(a) 2-hydroxymethylene - 6α,17α - dimethylandrostan-17β-ol-3-one can be prepared by replacement of the 17α-methyl-4-androsten-17β-ol-3-one in Example 4, part (a) by a molar equivalent amount of 6α,17α-dimethylandrostan-17β-ol-3-one.

(b) 6α,17α-dimethyl-17β-hydroxyandrostano[3.2-d]-2'- methylpyrimidine can be prepared by causing 2-hydroxymethylene-6α,17α-dimethylandrostan-17β-ol-3-one to react with acetamidine according to the manipulative procedure described above in Example 1, part (b).

EXAMPLE 81

(a) 2 - hydroxymethylene-17α-propyl-4-androsten-17β-ol-3-one can be prepared by replacement of the 17α-methyl-4-androsten17β-ol-3-one in Example 4, part (a) by a molar equivalent amount of 17α-propyl-4-androsten-17β-ol-3-one.

(b) 17β - hydroxy - 17α - propyl - 4 - androsteno[3.2-d] - 2' - methylpyrimidine [VI; R is H, R' is $(CH_2)_2CH_3$, R'' is $CH_3$, X is $H_2$, Z is OH, Y and Y' are $CH_3$] can be prepared by causing 2-hydroxymethylene-17α-propyl-4-androsten-17β-ol-3-one to react with acetamidine according to the manipulative procedure described above in Example 1, part (b).

EXAMPLE 82

(a) 2 - hydroxymethylene - 17α - allyl - 4 - androsten-17β-ol-3-one can be prepared by replacement of the 17α-methyl-4-androsten-17β-ol-3-one in Example 4, part (a) by a molar equivalent amount of 17α-allyl-4-androsten-17β-ol-3-one.

(b) 17α - allyl - 17β - hydroxy - 4 - androsteno[3.2-d]-2'-methylpyrimidine [VI; R is H, R' is $CH_2CH=CH_2$, R'' is $CH_3$, X is $H_2$, Z is OH, Y and Y' are $CH_3$] can be prepared by causing 2-hydroxymethylene-17α-allyl-4-androsten-17β-ol-3-one to react with acetamidine according to the manipulative procedure described above in Example 1, part (b).

EXAMPLE 83

(a) 2 - hydroxymethylene - 17α - propargyl - 4 - androsten-17β-ol-3-one can be prepared by replacement of the 17α-methyl-4-androsten-17β-ol-3-one in Example 4, part (a) by a molar equivalent amount of 17α-propargyl-4-androsten-17β-ol-3-one.

(b) 17β - hydroxy - 17α - propargyl - 4 - androsteno-[3.2 - d] - 2' - methylpyrimidine [VI; R is H, R' is $CH_2CH\equiv CH$, R'' is $CH_3$, X is $H_2$, Z is OH, Y and Y' are $CH_3$] can be prepared by causing 2-hydroxymethylene-17α-propargyl-4-androsten-17β-ol-3-one to react with acetamidine according to the manipulative procedure described above in Example 1, part (b).

EXAMPLE 84

(a) 2 - hydroxymethylene - 17α - propynyl - 4 - androsten-17β-ol-3-one can be prepared by replacement of the 17α-methyl-4-androsten-17β-ol-3-one in Example 4, part (a) by a molar equivalent amount of 17α-propynyl-4-androsten-17β-ol-3-one.

(b) 17β - hydroxy - 17α - propynyl - 4 - androsteno-[3.2-d]-2'-methylpyrimidine [VI; R is H, R' is $C\equiv CCH_3$, R'' is $CH_3$, X is $H_2$, Z is OH, Y and Y' are $CH_3$] can be prepared by causing 2-hydroxymethylene-17α-propynyl-4-androsten-17β-ol-3-one to react with acetamidine according to the manipulative procedure described above in Example 1, part (b).

EXAMPLE 85

(a) 2 - hydroxymethylene - 17α - propylandrostan-17β-ol-3-one can be prepared by replacement of the 17α-methyl-4-androsten-17β-ol-3-one in Example 4, part (a) by a molar equivalent amount of 17α-propylandrostan-17β-ol-3-one.

(b) 17β - hydroxy - 17α - propylandrostano[3.2 - d]-2'-methylpyrimidine [V; R is H, R' is $CH_2CH_2CH_3$, R'' is $CH_3$, X is $H_2$, Z is OH, Y and Y' are $CH_3$] can be prepared by causing 2-hydroxymethylene-17α-propylandrostan-17β-ol-3-one to react with acetamidine according to the manipulative procedure described above in Example 1, part (b).

EXAMPLE 86

(a) 2 - hydroxymethylene - 17α - methyl - 19 - nor - 4-androsten-17β-ol-3-one can be prepared by replacement of the 17α-methyl-4-androsten-17β-ol-3-one in Example 4, part (a) by a molar equivalent amount of 17α-methyl-19-nor-4-androsten-17β-ol-3-one.

(b) 17β - hydroxy - 17α - methyl - 19 - nor - 4 - androsteno[3.2-d]-2'-methylpyrimidine [VI; R is H, R' and R'' are $CH_3$, X is $H_2$, Z is OH, Y is H, Y' is $CH_3$] can be prepared by causing 2-hydroxymethylene-17α-methyl-19-nor-4-androsten-17β-ol-3-one to react with acetamidine according to the manipulative procedure described above in Example 1, part (b).

EXAMPLE 87

(a) 2 - hydroxymethylene - 17α - propynylandrostan-17β-ol-3-one can be prepared by replacement of the 17α-methyl-4-androsten-17β-ol-3-one in Example 4, part (a) by a molar equivalent amount of 17α-propynylandrostan-17β-ol-3-one.

(b) 17β - hydroxy - 17α - propynylandrostano[3.2-d]-2'-methylpyrimidine [V; R is H, R' is $C\equiv CCH_3$, R'' is $CH_3$, X is $H_2$ Z is OH, Y and Y' are $CH_3$] can be prepared by causing 2-hydroxymethylene-17α-propynylandrostan-17β-ol-3-one to react with acetamidine according to the manipulative procedure described above in Example 1, part (b).

EXAMPLE 88

(a) 2 -hydroxymethylene - 9α - fluoro - 4 - pregnene-11β,17α,21 - triol - 3,20 - dione 17,20;20,21 - bismethylenedioxy derivative was prepared from 8.54 g. of 9α-fluorohydrocortisone 17,20;20,21-bismethylenedioxy derivative, 24 ml. of ethyl formate and 1.2 g. of sodium hydride in benzene according to the manipulative procedure described above in Example 4, part (a).

(b) 9α - fluoro - 11β,17α,21 - trihydroxy - 20 - oxo - 4-pregneno[3.2 - d] - 2' - methylpyrimidine 17,20;20,21-bismethylenedioxy derivative can be prepared by causing 2 - hydroxymethylene - 9α - fluoro - 4 - pregnene - 11β, 17α,21 - triol - 3,20 - dione 17,20;20,21 - bismethylenedioxy derivative to react with acetamidine according to the manipulative procedure described above in Example 1, part (b).

(c) 21 - acetoxy - 9α - fluoro - 11β,17α - dihydroxy-20 - oxo 4 - pregneno[3.2 - d] - 2' - methylpyrimidine can be prepared by treating 9α-fluoro-11β,17α,21-trihydroxy - 20 - oxo - 4 - pregneno[3.2 - d] - 2' - methylpyrimidine 17,20;20,21-bismethylenedioxy derivative with perchloric acid in acetic acid to cleave the bismethylenedioxy group and acetylating the product with acetic anhydride in pyridine.

EXAMPLE 89

(a) 2 - hydroxymethylene - 4 - pregnene - 11β,17α,21-triol - 3,20 - dione 17,20;20,21 - bismethylenedioxy derivative was prepared from 12.6 g. of hydrocortisone 17,20;20,21-bismethylenedioxy derivative, 22 ml. of ethyl formate and 2.2 g. of sodium hydride in benzene according to the manipulative procedure described above in Example 4, part (a).

(b) 11β,17α,21 - trihydroxy - 20 - oxo - 4 - pregneno-[3.2 - d] - 2' - methylpyrimidine 17,20;20,21 - bismethylenedioxy derivative can be prepared by causing 2-hydroxy - 4 - pregnene - 11β,17α,21 - triol - 3,20 - dione 17,20;20,21-bismethylenedioxy derivative to react with acetamidine according to the manipulative procedure described above in Example 1, part (b).

(c) 11β,17α,21 - trihydroxy - 20 - oxo - 4 - pregneno-[3.2 - d] - 2' - methylpyrimidine [VI; R is H, R' is $COCH_2OH$, R'' is $CH_3$, X is (H)(OH), Z is OH, Y' are $CH_3$] can be prepared by treating 11β,17α,21-trihydroxy - 20 - oxo - 4 - pregneno[3.2 - d] - 2' - methylpyrimidine 17,20;20,21-bismethylenedioxy derivative with perchloric acid in acetic acid.

EXAMPLE 90

(a) 2 - hydroxymethylene - 4,4 - dimethyl - 5 - pregnene-3,20-dione 20-monoethylene glycol ketal was prepared from 4,4-dimethyl-5-pregnene-3,20-dione 20-monoethylene glycol ketal, ethyl formate and sodium hydride in benzene according to the manipulative procedure described above in Example 4, part (a). The product was recrystallized from ethyl acetate as a peach-colored solid and had the M.P. 182.2–183.4° C. (corr.) $[\alpha]_D{}^{25} = -14.6°$ (1% in chloroform).

Analysis.—Calcd. for $C_{26}H_{38}O_4$: C, 75.32; H, 9.24; O, 15.44. Found: C, 75.00; H, 9.55; O, 15.70.

(b) 4,4 - dimethyl-20-oxo-5-pregneno[3.2-d]-2'-methylpyrimidine can be prepared by causing 2-hydroxymethylene-4,4-dimethyl-5-pregnene-3,20-dione 20-monoethylene glycol ketal to react with acetamidine according to the manipulative procedure described above in Example 1, part (b), followed by heating with dilute hydrochloric acid to cleave the ketal group.

EXAMPLE 91

17β-hydroxy-17α-methyl - 1,3,5 - estratrieno[3.2-d] - 2'-methylpyrimidine can be prepared by heating 17β-hydroxy - 17β-methyl-19-nor-4-androsteno[3.2-d]-2'-methylpyrimidine with palladium catalyst; or by bromination of the latter compound at the 10-position by means of N-bromosuccinimide, followed by dehydrobromination by heating with collidine or with lithium chloride in dimethylformamide solution.

The following compounds can also be prepared by application of the procedures described hereinabove to the appropriate starting materials:

EXAMPLE 92

7α-acetylthio-17α-(β-carboxyethyl) - 17β - hydroxy-4-androsteno[3.2-d]-2'-methylpyrimidine 17-lactone from 3 - (3-oxo-7α-acetylthio-17β-hydroxy-4-androsten-17α-yl)-propionic acid lactone.

EXAMPLE 93

18-formyl-11β,21-dihydroxy - 20 - oxo - 4 - pregneno-[3.2-d]-2'-methylpyrimidine 11,18-lactol from aldosterone.

EXAMPLE 94

6α - fluoro-20-oxo-4-pregneno[3.2-d]-2'-methylpyrimidine from 6α-fluoro-4-pregnene-3,20-dione.

EXAMPLE 95

6 - fluoro - 20 - oxo - 4,6 - pregnadieno[3.2-d]-2'-methylpyrimidine from 6-fluoro-4,6-pregnadiene-3,20-dione.

EXAMPLE 96

17α-methyl-17β-hydroxy-19-nor - 4,9 - androstadieno-[3.2-d]-2'-methylpyrimidine from 17α-methyl-19-nor-4,9-androstadien-17β-ol-3-one.

EXAMPLE 97

7β,17α-dimethyl-17β-hydroxy - 4 - androsteno[3.2-d]-2' - methylpyrimidine from 7β,17α-dimethyl-4-androsten-17β-ol-3-one (7β,17α-dimethyltestosterone).

EXAMPLE 98

5 - methyl - 11β,17α,21 - trihydroxy - 20 - oxypregnano-[3.2-d]-2'-methylpyrimidine from 5-methyl-17α,20;20,21-bismethylenedioxypregnan-11β-ol-3-one.

EXAMPLE 99

10α - methyl-9β-H-20-oxo-19-nor - 4,6 - pregnadieno-[3.2-d]-2'-methylpyrimidine from 10α-methyl-9β-H-19-nor-4,6-pregnadiene-3,20-dione.

EXAMPLE 100

10α-methyl - 9β - H - 17β - hydroxy-19-nor-4,6-androstadieno-[3.2-d]-2'-methylpyrimidine from 10α-methyl-9β-H-19-nor-4,6-androstadien-17β-ol-3-one.

Also within the purview of the invention are pyrimidine derivatives of D-homosteroids. The following such compounds can be prepared by procedures analogous to those described hereinabove:

EXAMPLE 101

17α-oxa - 17 - oxo - D - homo-4-androsteno[3.2-d]-2'-methylpyrimidine from testololactone.

EXAMPLE 102

20-oxo - D - homo-4-pregneno[3.2-d]-2'-methylpyrimidine from D-homo-4-pregnene - 3,20 - dione (D-homoprogesterone).

EXAMPLE 103

17β - hydroxy-D-homo-4-androsteno[3.2-d]-2'-methylpyrimidine from D-homo-4-androsten-17β-ol-3-one (D-homotestosterone).

EXAMPLE 104

17α-methyl-17β-hydroxy - D - homoandrostano[3.2-d]-2'-methylpyrimidine from 17α-methyl-D-homoandrostan-17β-ol-3-one.

EXAMPLE 105

9α,17β - dihydroxyandrostano[3.2-d]-2'-methylpyrimidine from 9α,17β-dihydroxyandrostan-3-one.

EXAMPLE 106

9α,17β - dihydroxyandrostano[3.2-d] - 2' - methylpyrimidine can be treated with a solution of hydrogen fluoride in pyridine to give 9α-fluoro-17β-hydroxyandrostano-[3.2-d]-2'-methylpyrimidine; and the latter can be oxidized with chromium trioxide in pyridine to give 9α-fluoro-17-oxoandrostano[3.2-d]-2'-methylpyrimidine.

EXAMPLE 107

17β-hydroxy - (1,3) - androstadieno[3.2-d]-2'-methylpyrimidine can be prepared from 2-acetylandrostan-17β-ol-3-one (Example 20(b)) by brominating the latter with bromine in pyridine to give the 2-bromo derivative, M.P. 119.0–121.0° C. (corr.), $[\alpha]_D = +163.8°$ (1% in chloroform), dehydrobrominating the latter with collidine to give 2-acetyl-1-androsten-17β-ol-3-one, followed by reaction with acetamidine in the usual manner.

I claim:
1. A steroido[3.2-d]pyrimidine, the steroid moiety having from seventeen to about twenty-three carbon atoms exclusive of ester radicals and being selected from the group consisting of the estrane, 18-norestrane, androstane, etiocholane, pregnane and allopregnane series; and wherein the carbon atoms of the pyrimidine moiety are substituted by a member of the group consisting of hydrogen and lower-alkyl.
2. A compound selected from the group consisting of (A) compounds having the formula wherein R and R" represent members of the group consisting of hydrogen and lower-alkyl; R' represents a member of the group consisting of hydrogen, lower-alkyl, lower-alkenyl, lower-alkynyl, acetyl, hydroxyacetyl, 1,2-dihydroxyethyl and 1-hydroxyethyl; X represents a member of the group consisting of $H_2$, (H)(OH) and O; Y and Y' represents members of the group consisting of hydrogen and methyl; and Z represents a member of the group consisting of hydrogen and hydroxy, Z being restricted to hydroxy when R' represents a member of the group consisting of hydrogen, lower-alkyl, lower-alkenyl and lower-alkynyl; and (B) carboxylic acid esters of carbinols thereof, the acyl moieties of said esters having from one to about ten carbon atoms and having a molecular weight less than about 200.

3. A compound selected from the group consisting of (A) compounds having the formula

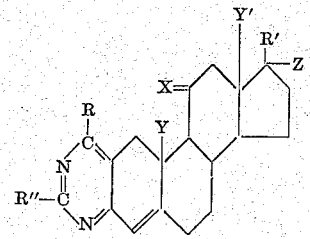

wherein R and R″ represent members of the group consisting of hydrogen and lower-alkyl; R′ represents a member of the group consisting of hydrogen, lower-alkyl, lower-alkenyl, lower-alkynyl, acetyl, hydroxyacetyl, 1,2-dihydroxyethyl and 1-hydroxyethyl; X represents a member of the group consisting of $H_2$, (H)(OH) and O; Y and Y′ represent members of the group consisting of hydrogen and methyl; and Z represents a member of the group consisting of hydrogen and hydroxy, Z being restricted to hydroxy when R′ represents a member of the group consisting of hydrogen, lower-alkyl, lower-alkenyl and lower-alkynyl; and (B) carboxylic acid esters of carbinols thereof, the acyl moieties of said esters having from one to about ten carbon atoms and having a molecular weight less than about 200.

4. A compound selected from the group consisting of (A) compounds having the formula

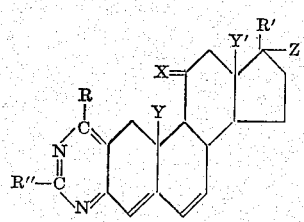

wherein R and R″ represent members of the group consisting of hydrogen and lower-alkyl; R′ represents a member of the group consisting of hydrogen, lower-alkyl, lower-alkenyl, lower-alkynyl, acetyl, hydroxyacetyl, 1,2-dihydroxyethyl and 1-hydroxyethyl; X represents a member of the group consisting of $H_2$, (H)(OH) and O; Y and Y′ represent members of the group consisting of hydrogen and methyl; and Z represents a member of the group consisting of hydrogen and hydroxy, Z being restricted to hydroxy when R′ represents a member of the group consisting of hydrogen, lower-alkyl, lower-alkenyl and lower-alkynyl; and (B) carboxylic acid esters of carbinols thereof, the acyl moieties of said esters having from one to about ten carbon atoms and having a molecular weight less than about 200.

5. 17β - hydroxy - 17α - methylandrostano[3.2 - d] - 2′ - methylpyrimidine.

6. 17β-hydroxyandrostano[3.2-d]-2′-methylprimidine.

7. 17β - hydroxy-17α-methylandrostano[3.2-d]pyrimi- 8. 17β - acetoxy-4-androsteno[3.2-d]-2′-methylpyrimidine.

9. 17α,20;20,21 - bismethylene - dioxy - 11-oxo-4-pregneno[3.2-d]pyrimidine.

10. 17α,20;20,21 - bismethylene - dioxy - 11-oxo-4-pregneno[3.2-d]-2′-methylpyrimidine.

11. The process for preparing a pyrimidine compound fused through its 4- and 5-positions to the 3- and 2-positions, respectively, of a steroid nucleus, which comprises reacting a 2-(1-hydroxyalkylidene)-3-oxo-steroid with a member of the group consisting of a lower-alkanoamidine and acid-addition salts thereof in the presence of a base selected from the group consisting of basic tertiary amines and alkali metal alkoxides, the steroid moiety having from seventeen to about twenty-three carbon atoms exclusive of ester radicals and being selected from the group consisting of the estrane, 18-norestrane, androstane, etiocholane, pregnane and allopregnane series.

12. The process for preparing a compound selected from the group consisting of (A) compounds having the formula

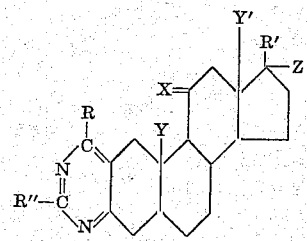

wherein R and R″ represent members of the group consisting of hydrogen and lower-alkyl; R′ represents a member of the group consisting of hydrogen, lower-alkyl, lower-alkenyl, lower alkynyl, ketalized acetyl, ketalized hydroxyacetyl, 1,2-dihydroxyethyl and 1-hydroxyethyl; X represents a member of the group consisting of $H_2$, (H)(OH) and O; Y and Y′ represent members of the group consisting of hydrogen and methyl; and Z represents a member of the group consisting of hydrogen and hydroxy, Z being restricted to hydroxy when R′ represents a member of the group consisting of hydrogen, lower-alkyl, lower-alkenyl and lower-alkynyl; and (B) carboxylic acid esters of carbinols thereof, the acyl moieties of said esters having from one to about ten carbon atoms and having a molecular weight less than about 200, which comprises reacting a compound having the formula

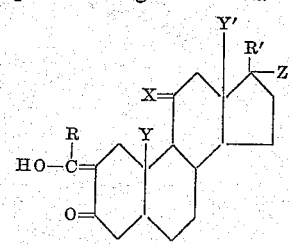

wherein R, R′, X, Z, Y and Y′ are identical with their selection above, with a member of the group consisting of a lower-alkanoamidine and acid-addition salts thereof in the presence of a base selected from the group consisting of basic tertiary amines and alkali metal alkoxides.

13. The process for preparing a compound selected from the group consisting of (A) compounds having the formula

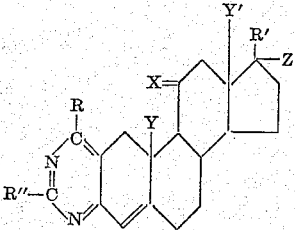

wherein R and R″ represent members of the group consisting of hydrogen and lower-alkyl; R′ represents a member of the group consisting of hydrogen, lower-alkyl, lower-alkenyl, lower-alkynyl, ketalized acetyl, ketalized hydroxyacetyl, 1,2-dihydroxyethyl and 1-hydroxyethyl; X represents a member of the group consisting of $H_2$, (H) (OH) and O; Y and Y′ represent members of the group consisting of hydrogen and methyl; and Z represents a member of the group consisting of hydrogen and hydroxy, Z being restricted to hydroxy when R′ represents a member of the group consisting of hydrogen, lower-alkyl, lower-alkenyl and lower-alkynyl; and (B) carboxylic acid esters of carbinols thereof, the acyl moieties of said esters having from one to about ten carbon atoms and having a molecular weight less than about 200, which comprises reacting a compound having the formula

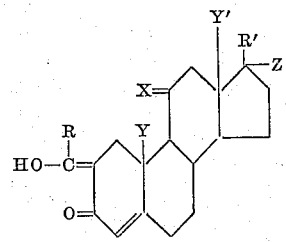

wherein R, R', X, Z, Y and Y' are identical with their selection above, with a member of the group consisting of a lower-alkanoamidine and acid-addition salts thereof in the presence of a base selected from the group consisting of basic tertiary amines and alkali metal alkoxides.

14. The process for preparing a compound selected from the group consisting of (A) compounds having the formula

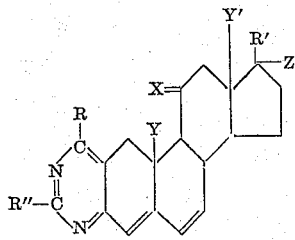

wherein R and R" represent members of the group consisting of hydrogen and lower-alkyl; R' represents a member of the group consisting of hydrogen, lower-alkyl, lower-alkenyl, lower-alkynyl, ketalized acetyl, ketalized hydroxyacetyl, 1,2-dihydroxyethyl and 1-hydroxyethyl; X represents a member of the group consisting of $H_2$, (H)(OH) and O; Y and Y' represent members of the group consisting of hydrogen and methyl; and Z represents a member of the group consisting of hydrogen and hydroxy, Z being restricted to hydroxy when R' represents a member of the group consisting of hydrogen, lower-alkyl, lower-alkenyl and lower-alkynyl; and (B) carboxylic acid esters of carbinols thereof, the acyl moieties of said esters having from one to about ten carbon atoms and having a molecular weight less than about 200, which comprises reacting a compound having the formula

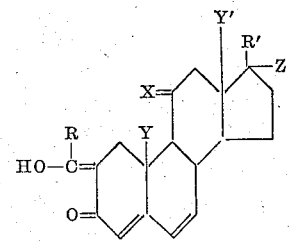

wherein R, R', X, Z, Y and Y' are identical with their selection above, with a member of the group consisting of a lower-alkanoamidine and acid-addition salts thereof in the presence of a base selected from the group consisting of basic tertiary amines and alkali metal alkoxides.

References Cited in the file of this patent

UNITED STATES PATENTS 3,026,317  Ringold et al. _____ Mar. 20, 1962

UNITED STATES PATENT OFFICE
CERTIFICATE OF CORRECTION

Patent No. 3,132,137　　　　　　　　　　　　　　　May 5, 1964

Raymond O. Clinton

It is hereby certified that error appears in the above numbered patent requiring correction and that the said Letters Patent should read as corrected below.

Column 3, lines 17 to 27, and lines 41 to 51, the left-hand portions of formulas (V) and (VI) should appear as shown below instead of as in the patent:

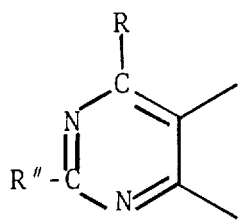

column 16, line 15, for "17β-ol-one", in italics, read -- 17β-ol-3-one --, in italics; line 16, for "-17β-ol-one" read -- -17β-ol-3-one --; column 19, line 69, for "17β-", in italics, read -- 17α- --, in italics; column 20, line 28, for "-6],17β-", in italics, read -- -6β,17β- --, in italics; column 22, line 29, for "2-hydroxymethylallopregnane-" read -- 2-hydroxymethylene-allopregnane- --; column 23, line 57, for "[3.2-]-", in italics, read -- [3.2-d]- --, in italics; column 25, line 43, for "CH₂CH≡CH" read -- CH₂C≡CH --; column 26, lines 64 and 65, for "2-hydroxy-" read -- 2-hydroxymethylene- --; column 27, line 24, for "-17β-methyl-" read -- -17α-methyl- --; column 28, line 6, for "17α-oxa-", in italics, read -- 17a-oxa- --, in italics; column 29, line 62, for "methylprimidine" read -- methylpyrimidine --; line 63, for "pyrimi-" read -- pyrimidine.--.

Signed and sealed this 20th day of October 1964.

(SEAL)
Attest:

ERNEST W. SWIDER　　　　　　　　　　　　　　　EDWARD J. BRENNER
Attesting Officer　　　　　　　　　　　　　　　Commissioner of Patents